(12) United States Patent
Johnson

(10) Patent No.: US 7,444,868 B2
(45) Date of Patent: *Nov. 4, 2008

(54) FORCE REBALANCING FOR MEMS INERTIAL SENSORS USING TIME-VARYING VOLTAGES

(75) Inventor: Burgess R. Johnson, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/427,767

(22) Filed: Jun. 29, 2006

(65) Prior Publication Data
US 2008/0000296 A1    Jan. 3, 2008

(51) Int. Cl.
*G01P 9/04* (2006.01)
(52) U.S. Cl. ............................ 73/504.12; 73/504.14
(58) Field of Classification Search ............ 73/504.02, 73/504.04, 504.12, 504.14, 504.15, 514.32
See application file for complete search history.

(56) References Cited

U.S. PATENT DOCUMENTS

| | | | |
|---|---|---|---|
| 5,473,945 A | 12/1995 | Grieff et al. | |
| 5,481,914 A | 1/1996 | Ward | |
| 5,555,765 A * | 9/1996 | Greiff | 73/504.09 |
| 5,600,064 A | 2/1997 | Ward | |
| 5,604,309 A | 2/1997 | Ward | |
| 5,635,739 A | 6/1997 | Grieff et al. | |
| 5,672,949 A | 9/1997 | Ward | |
| 5,747,961 A * | 5/1998 | Ward et al. | 318/646 |
| 5,752,410 A * | 5/1998 | Bernstein | 73/514.18 |
| 5,767,405 A * | 6/1998 | Bernstein et al. | 73/504.16 |
| 5,796,001 A | 8/1998 | Greiff et al. | |
| 5,892,153 A | 4/1999 | Weinberg et al. | |
| 5,945,599 A | 8/1999 | Fujiyoshi et al. | |
| 5,955,668 A | 9/1999 | Hsu et al. | |
| 5,992,233 A | 11/1999 | Clark | |
| 6,067,858 A | 5/2000 | Clark et al. | |
| 6,164,134 A | 12/2000 | Cargille | |
| 6,230,563 B1 | 5/2001 | Clark et al. | |
| 6,250,156 B1 | 6/2001 | Seshia et al. | |
| 6,311,555 B1 | 11/2001 | McCall et al. | |
| 6,360,601 B1 | 3/2002 | Challoner et al. | |
| 6,370,937 B2 | 4/2002 | Hsu | |
| 6,439,050 B1 | 8/2002 | Musalem et al. | |
| 6,445,195 B1 | 9/2002 | Ward | |
| 6,453,743 B1 | 9/2002 | Royle et al. | |
| 6,456,939 B1 | 9/2002 | McCall et al. | |
| 6,481,283 B1 | 11/2002 | Cardarelli | |

(Continued)

FOREIGN PATENT DOCUMENTS

EP    0895059    2/1999

*Primary Examiner*—Helen C. Kwok
(74) *Attorney, Agent, or Firm*—Black Lowe & Graham PLLC

(57) ABSTRACT

MEMS devices and methods employing one or more electrodes coupled to a time-varying rebalancing voltage are disclosed. A MEMS inertial sensor in accordance with an illustrative embodiment can include one or more proof masses, at least one sense electrode positioned adjacent to each proof mass, and one or more torquer electrodes. Rebalancing voltages can be applied to the torquer electrodes to electrostatically null quadrature and/or Coriolis-related proof mass motion along a sense axis of the device. The rebalancing voltages applied to each of the torquer electrodes can be adjusted using feedback from one or more force rebalancing control loops.

27 Claims, 13 Drawing Sheets

U.S. PATENT DOCUMENTS

| | | |
|---|---|---|
| 6,481,285 B1 | 11/2002 | Shkel et al. |
| 6,619,121 B1 | 9/2003 | Stewart et al. |
| 6,621,279 B2 | 9/2003 | Ward |
| 6,651,500 B2 | 11/2003 | Stewart et al. |
| 6,671,648 B2 | 12/2003 | McCall et al. |
| 6,674,294 B2 | 1/2004 | Ward |
| 6,675,630 B2 | 1/2004 | Challoner et al. |
| 6,701,786 B2 | 3/2004 | Hulsing, II |
| 6,714,025 B2 | 3/2004 | Mohaupt et al. |
| 6,715,353 B2 | 4/2004 | Johnson |
| 6,718,823 B2 | 4/2004 | Platt |
| 6,792,802 B2 | 9/2004 | Platt |
| 6,841,992 B2 | 1/2005 | Yue et al. |
| 7,036,373 B2 * | 5/2006 | Johnson et al. ........... 73/504.14 |
| 7,213,458 B2 * | 5/2007 | Weber et al. ............. 73/504.12 |
| 2002/0020219 A1 | 2/2002 | DeRoo et al. |
| 2002/0190607 A1 | 12/2002 | Paden et al. |
| 2003/0033850 A1 | 2/2003 | Challoner et al. |
| 2003/0084722 A1 | 5/2003 | Kim et al. |
| 2003/0216884 A1 | 11/2003 | Cardarelli |
| 2005/0104756 A1 | 5/2005 | Tazartes et al. |

* cited by examiner

FORCE REBALANCING FOR MEMS INERTIAL SENSORS USING TIME-VARYING VOLTAGES

GOVERNMENT SUPPORT

This invention was made with government support under U.S. Army CERDEC contract number W15P7T-05-C-P609. The government may have certain rights in the invention.

FIELD

The present invention relates generally to the field of microelectromechanical (MEMS) devices. More specifically, the present invention pertains to devices and methods for reducing rate bias errors and scale factor errors using time-varying force rebalancing voltages.

BACKGROUND

Microelectromechanical (MEMS) gyroscopes are used to detect angular rotation about an input axis by measuring Coriolis forces exerted on a number of resonating proof masses. A typical MEMS gyroscope includes two silicon proof masses mechanically coupled to a silicon or glass substrate by suspension springs. A number of recesses etched into the substrate allow selective portions of the silicon structure to move back and forth freely within an interior portion of the device. A pattern of metal traces formed on the substrates can be used to deliver various electrical bias voltages and signal outputs to the device.

The drive system for MEMS gyroscopes typically includes a number of drive elements that cause the proof masses to oscillate back and forth along a drive axis perpendicular to the direction in which Coriolis forces are sensed. A motor mode of the gyroscope may comprise two proof masses moving at equal but opposite velocities in a direction substantially parallel to the substrate and along a line connecting the centers of the proof masses. In some applications, the motor mode of the proof masses can be driven electrostatically at its resonant frequency using a number of interdigitated comb drive fingers adapted to convert electrical energy into mechanical energy by electrostatic actuation. When the gyroscope is rotated about its input axis perpendicular to the drive axis, the motor mode velocity of the proof masses produces a Coriolis force that drives the proof masses along a sense axis perpendicular to the drive axis and input axis.

The sensing system of the gyroscope may include one or more sense electrodes that can be charged with a DC sense bias voltage to produce an electric field in the spaces between the sense electrodes and proof masses. A sense resonant mode of the gyroscope typically includes movement of the two proof masses at equal but opposite velocities along the sense axis. The Coriolis force due to the motor velocity drives the sense resonant mode, typically at or near the frequency of motor motion. In some designs, the Coriolis force drives the sense mode off-resonance.

As each proof mass moves back and forth above the substrate, the Coriolis force resulting from rotation of the gyroscope about the input axis causes the spacing between the proof masses and sense electrodes to vary. The displacement of sense resonant mode motion can then be determined capacitively by detecting the current induced on the proof masses due to the time-varying sense capacitance. By measuring the output current produced on the proof masses, a measure of the rotational motion and/or acceleration of the gyroscope can be ascertained.

A significant source of errors in many MEMS-type gyroscopes is attributable to quadrature motion of the proof masses, defined as motion along the sense axis 90° out-of-phase with the motion produced by the Coriolis force. The resultant mechanical feedthrough signal caused by such quadrature motion is often referred to as the quadrature signal, and typically includes an AC output signal of the gyroscope that is 90° out-of-phase with the signal produced by the Coriolis force. Such quadrature may result, for example, from imperfections in the profile of the comb fingers and suspension springs used in the drive system, and from other imperfections created during the manufacturing process. Such imperfections or errors can result in the motor motion producing a quadrature force on the sense mode motion that is in-phase with the motor displacement, and therefore out-of-phase with the motor velocity.

The quadrature force may be several orders of magnitude greater than the smallest detectable Coriolis force, affecting the ability of the gyroscope to accurately discern subtle variations in the rate signal. As a result, additional error correction circuitry is typically required to remove the quadrature signal from the output sense signal. While the effect of the quadrature force on the gyroscopic rate output signal is typically reduced by the fact that it is 90° out-of-phase with the Coriolis force, small phase errors in the inertial sensor and associated electronics can nevertheless produce errors in the rate output signal, diminishing the ability of the gyroscope to accurately detect and measure rotation.

SUMMARY

The present invention relates to devices and methods for reducing rate bias errors and scale factor errors using time-varying rebalancing voltages. A MEMS inertial sensor in accordance with an illustrative embodiment of the present invention can include one or more proof masses adapted to oscillate in a drive axis above a substrate, at least one sense electrode positioned adjacent to each of the one more proof masses, and at least one torquer electrode positioned adjacent to each of the one or more proof masses.

Time-varying rebalancing voltages applied to one or more of the torquer electrodes can be configured to electrostatically null proof mass motion along a sense axis perpendicular to the drive axis, thus maintaining a fixed capacitance between each sense electrode and corresponding proof mass. In certain embodiments, the time-varying rebalancing voltages applied to each of the torquer electrodes can include an AC rebalancing voltage having a rebalancing voltage signal component based on feedback from one or more force rebalancing control loops. During operation, the output of the inertial sensor is the rebalancing voltage used to provide the necessary feedback force to null the Coriolis and quadrature forces on the proof masses rather than the currents induced by proof mass displacement.

In some embodiments, the electrostatic nulling of quadrature and Coriolis related proof mass motions can be accomplished using a sinusoidal rebalancing voltages applied to the one or more torquer electrodes. In one illustrative embodiment, for example, sinusoidal rebalancing voltages can be applied to one or more of the torquer electrodes to cancel both quadrature and Coriolis related proof mass motions, thus maintaining a fixed capacitance between each sense electrode and corresponding proof mass. In other embodiments, maintenance of a fixed capacitance between each sense electrode and corresponding proof mass can be accomplished using separate sinusoidal voltages for rebalancing quadrature and Coriolis motion with separate voltages each applied to separate torquer electrodes. The sinusoidal rebalancing voltages applied to the torquer electrodes can be controlled in closed-loop fashion based at least in part on feedback signals received from the output of the inertial sensor.

An illustrative method of force rebalancing a MEMS inertial sensor can include the steps of providing at least one torquer electrode adjacent to each of the one or more proof masses, applying one or more time-varying rebalancing voltages to at least one torquer electrode, sensing displacement of the one or more proof masses along the sense axis and outputting a sense voltage proportional to such proof mass displacement, and electrostatically nulling any proof mass motion along the sense axis based on the outputted sense voltage. By employing a force rebalancing method that compensates for many of the non-linearities associated with capacitively sensing proof mass displacement, the inertial sensor can be configured to operate over a wider dynamic range while eliminating or reducing rate bias and scale factors errors than can diminish sensor performance. Other factors such as sensor reliability, sensor life, and long term drift may also be improved in certain circumstances using force rebalancing.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized. While the various drawings illustrated are described with respect to MEMS-type in-plane gyroscopes, it should be understood that the features and methods herein could be used with other MEMS devices employing electrostatic actuators such z-axis or out-of-plane gyroscopes, which have their input rotation perpendicular to the substrate.

Figure 1:
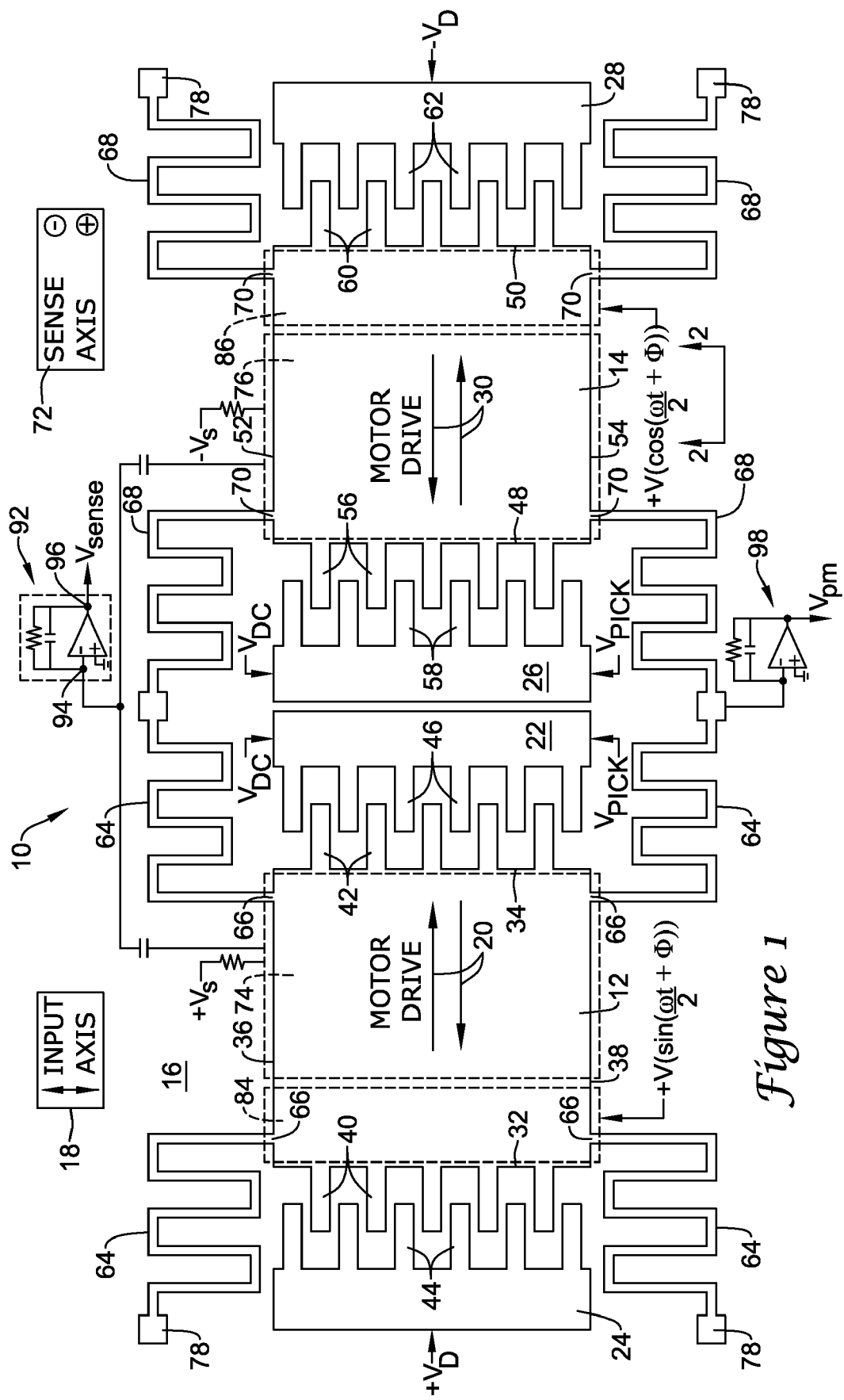
FIG. 1 is a schematic view of an illustrative MEMS-type gyroscope in accordance with an exemplary embodiment of the present invention.

Referring now to FIG. 1, a schematic view of an illustrative MEMS-type gyroscope 10 in accordance with an exemplary embodiment of the present invention will now be described. Gyroscope 10, illustratively an in-plane gyroscope (IPG), includes a first proof mass 12 and second proof mass 14, each of which are adapted to oscillate back and forth above an underlying support substrate 16 along a drive axis perpendicular to an input axis 18 of the gyroscope 10 in which inertial motion is to be determined. As indicated generally by the right/left set of arrows 20, the first proof mass 12 can be configured to oscillate back and forth above the support substrate 16 between a first motor pickoff comb 22 and first drive electrode 24, both of which remain stationary above the support substrate 16 to limit movement of the first proof mass 12. The second proof mass 14, in turn, can be configured to oscillate back and forth above the support substrate 16 in a similar manner between a second motor pickoff comb 26 and second drive electrode 28, but 180° degrees out-of-phase with the first proof mass 12, as indicated generally by the left/right set of arrows 30.

The first proof mass 12 can include a thin plate or other suitable structure having a first end 32, a second end 34, a first side 36, and a second side 38. Extending outwardly from each end 32,34 of the first proof mass 12 are a number of comb fingers 40,42 used to electrostatically drive the first proof mass 12 in the direction indicated by the right/left set of arrows 20. In the illustrative gyroscope 10 depicted in FIG. 1, for example, a first set of comb fingers 40 extending outwardly from the first end 32 of the first proof mass 12 can be interdigitated with a corresponding set of comb drive fingers 44 formed on the first drive electrode 24. A second set of comb fingers 42 extending outwardly from the second end 34 of the first proof mass 12, in turn, can be interdigitated with a corresponding set of comb fingers 46 formed on the first motor pickoff comb 22.

The second proof mass 14 can be configured similar to the first proof mass 12, having a first end 48, a second end 50, a first side 52, and a second side 54. A first set of comb fingers 56 extending outwardly from the first end 48 of the second proof mass 16 can be interdigitated with a corresponding set of comb fingers 58 formed on the second motor pickoff comb 26. A second set of comb fingers 60 extending outwardly from the second end 50 of the second proof mass 14, in turn, can be interdigitated with a corresponding set of comb fingers 62 formed on the second drive electrode 28.

The first and second proof masses 12,14 can be constrained in one or more directions above the underlying support structure 16 using one or more suspension springs. As shown in FIG. 1, for example, the first proof mass 12 can be anchored or otherwise coupled to the support substrate 16 using a first set of four suspension springs 64, which can be connected at each end 66 to the four corners of the first proof mass 12. In similar fashion, the second proof mass 14 can be anchored to the underlying support substrate 16 using a second set of four springs 68, which can be connected at each end 70 to the four corners of the second proof mass 14. In use, the suspension springs 64,68 can be configured to isolate oscillatory movement of the first and second proof masses 12,14 to the direction indicated generally by the right/left set of arrows 20,30 to reduce undesired perpendicular motion in the direction of the input axis 18, and to reduce quadrature motion along a sense axis 72 of the gyroscope 10 in which Coriolis forces are sensed. In addition to supporting the proof masses 12,14 above the support substrate 16, the suspension springs 64,68 can also be configured to provide restorative forces along the drive axis when the proof masses are displaced from their equilibrium position along the drive axis.

A drive voltage $V_D$ can be applied to the first and second drive electrodes 24,28, inducing an electrostatic force between the interdigitated comb fingers that causes the comb fingers to electrostatically move with respect to each other. The drive voltage $V_D$ can be configured to output a time-varying voltage signal to alternate the charge delivered to the comb fingers, which in conjunction with the suspension springs 64,68, causes the first and second proof masses 12,14 to oscillate back and forth in a particular manner above the support substrate 16. Typically, the drive voltage $V_D$ will have a frequency that corresponds with the resonant frequency of the first and second proof masses 12,14, although other desired drive frequencies can be employed, if desired.

A motor pickoff bias voltage $V_{DC}$ can be provided across the first and second motor pickoff combs 22,26 to detect and/or measure displacement of the proof masses 12,14 along the direction 20,30 of the drive motion. A motor pickoff voltage $V_{PICK}$ resulting from movement of the comb fingers 42,56 on the first and second proof masses 12,14 relative to the comb fingers 46,58 on the first and second motor pickoff combs 22,26 can be used to detect motion of the first and second proof masses 12,14.

A number of sense electrodes 74,76 can be provided as part of the sensing system to detect and measure the out-of-plane deflection of the first and second proof masses 12,14 along the sense axis 72 as a result of gyroscopic movement about the input axis 18. As indicated generally by the dashed lines in FIG. 1, the sense electrodes 74,76 can include a thin, rectangular-shaped electrode plate positioned underneath at least a portion of the proof masses 12,14. In some embodiments, a second number of sense electrodes 78,80 formed on an upper substrate 82 of the gyroscope 10 (see FIGS. 2 and 3) can be further positioned above each of the proof masses 12,14, if desired. The sense electrodes 74,76,78,80 can be configured in size and shape to minimize electrical interference with the surrounding comb fingers 42,56 to prevent leakage of the drive voltage $V_D$ signal into the sense signal.

A DC sense bias voltage $V_S$ applied to each of the sense electrodes 74,76,78,80 can be utilized to induce a charge on the first and second proof masses 12,14 proportional to the capacitance between the respective sense electrode 74,76,78, 80 and proof mass 12,14.

A number of torquer electrodes 84,86 can be configured to mechanically null any motion of the proof masses 12,14 along the sense axis 72 due to Coriolis forces caused by rotation of the gyroscope 10 about the input axis 18 and/or from any quadrature forces. The torquer electrodes 84,86 can be configured similar to the sense electrodes 74,76,78,80, each comprising a thin rectangular-shaped electrode plate positioned underneath at least a portion of the proof masses 12,14. In some embodiments, a second number of torquer electrodes 88,90 can be further positioned above each of the proof masses 12,14, if desired. The torquer electrodes 84,86, 88,90 can be configured in size and shape to minimize electrical interference with the surrounding comb fingers 40,60 and sense electrodes 74,76,78,80.

During operation, the sense electrodes 74,76,78,80 can be used to sense motion of the proof masses 12,14 along the sense axis 72 as a result of Coriolis forces and any quadrature forces. The sense bias voltage $V_S$ applied to the sense electrodes 74,76,78,80 produces a charge on each of the proof masses 12,14 proportion to their out-of-plane displacement, producing a current that is fed to a charge amplifier 92 having an input node 94 and an output node 96. The charge amplifier 92 converts the current produced by the time-varying sense capacitances into an output sense voltage $V_{sense}$ proportional to the electrostatic nulling force required to maintain zero displacement of the proof masses 12,14 along the sense axis 72. In some embodiments, a second charge amplifier 98 coupled to each of the proof masses 12,14 and adapted to output a voltage signal $V_{PM}$ can be used to maintain the proof masses 12,14 at virtual ground. Alternatively, and in other embodiments, the proof masses 12,14 can be hard ground.

Time-varying rebalancing voltages applied to each of the torquer electrodes 84,86,88,90 can be utilized to electrostatically null any motion of the proof masses 12,14 along the sense axis 72, thereby maintaining a fixed capacitance between the sense electrodes 74,76,78,80 and the proof masses 12,14. In certain embodiments, and as described in greater detail below with respect to FIG. 3, the time-varying rebalancing voltages may comprise closed-loop AC feedback control signals obtained by passing the output sense voltage $V_{sense}$ of the charge amplifier 92 through one or more feedback control loops. As shown in FIG. 1, the rebalancing voltage $V_S$ in($\omega t/2+\Phi$) applied to the torquer electrode 84 adjacent the first proof mass 12 can be 90° out-of-phase with the rebalancing voltage V cos($\omega t/2+\Phi$) applied to the torquer electrode 86 adjacent the second proof mass 14. A phase offset factor $\Phi$ can be used by the feedback control electronics to provide nulling of the Coriolis and quadrature force simultaneously.

To ensure that the output signal from the charge amplifier 92 is sensitive to only differential motion of the proof masses 12,14 along the sense axis 72, the sense bias voltage $V_S$ used to sense motion of the first proof mass 12 can have a polarity opposite that of the sense bias voltage $V_S$ used to sense motion of the second proof mass 14. In certain embodiments, for example, a sense bias voltage $V_S$ of +5V and −5V, respectively, can be applied to each of the lower sense electrodes 74,76 and upper electrodes 78,80 so that the voltage at the output node 96 of the charge amplifier 92 is sensitive only to differential mode motion of the proof masses 12,14.

Figure 2:
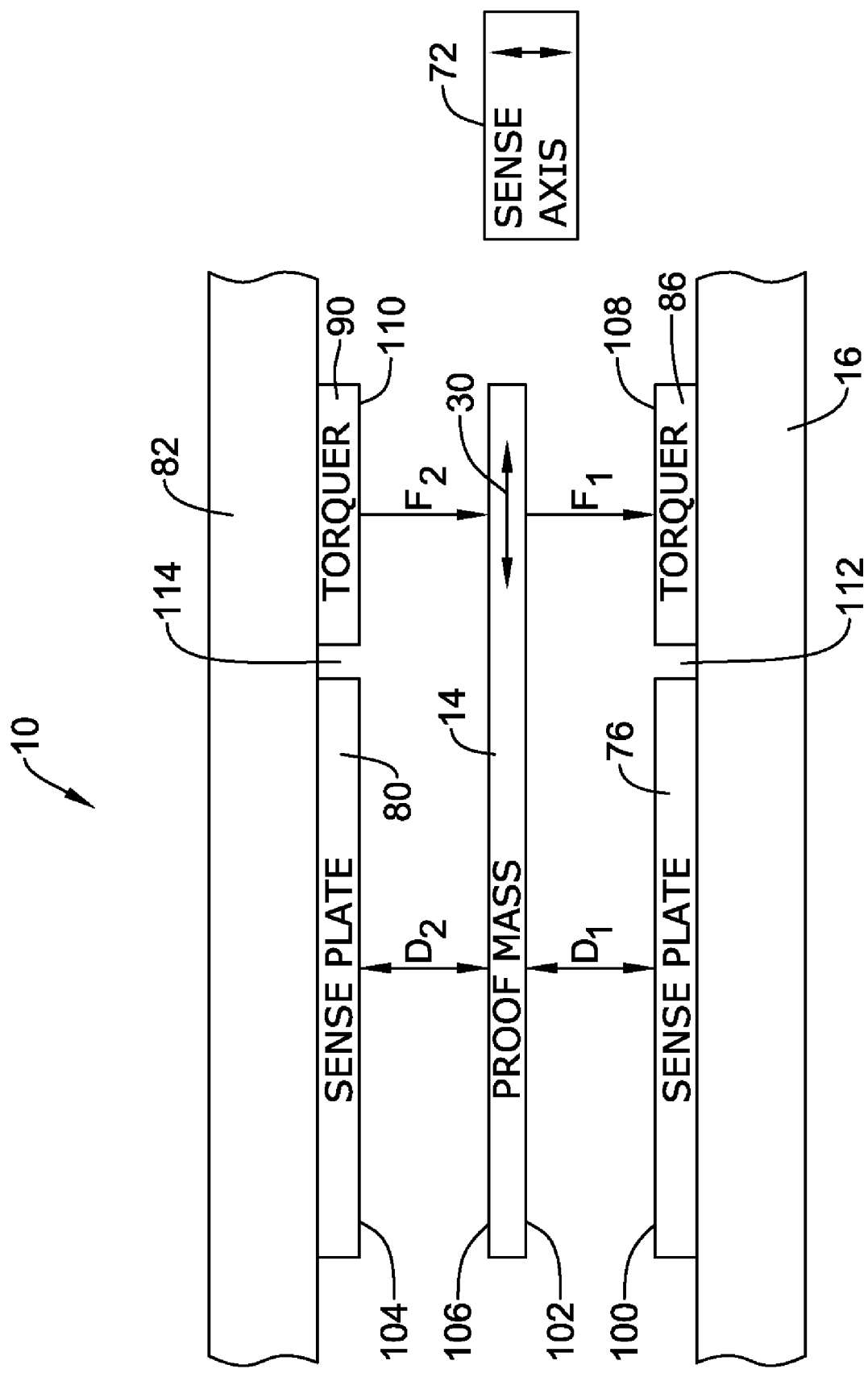
FIG. 2 is a side cross-sectional view showing the illustrative gyroscope along line 2-2 of FIG. 1.

FIG. 2 is a side cross-sectional view illustrating the operation of the sense electrodes and torquer electrodes of FIG. 1 in greater detail. As shown in FIG. 2, the lower sense electrode 76 can be positioned on or in the lower substrate 16 of the gyroscope 10, and can be oriented in a manner such that an upper face 100 thereof is positioned vertically adjacent to and parallel with the bottom surface 102 of the proof mass 14. The upper sense electrode 80, in turn, can be positioned on or in the upper substrate 82 of the gyroscope 10, and oriented in a manner such that a lower face 104 thereof is positioned vertically adjacent to and parallel with the top surface 106 of the proof mass 14. The lower and upper sense electrodes 76,80 can each be spaced a distance $D_1$ and $D_2$, respectively, away from the bottom and upper surfaces 102,106 of the proof mass 14. Typically, the lower and upper sense electrodes 76,80 will be spaced the same distance from the proof mass 14 (i.e. $D_1=D_2$), although other embodiments wherein the sense electrodes 76,80 are spaced at varying distances (i.e. $D_1 \neq D_2$) from the proof mass 14 are also contemplated.

The lower and upper torquer electrodes 84,86 88,90 can be positioned on or in the substrates 16,82 in a manner so as to provide electrostatic forces on the proof masses 12,14 that mechanically null any proof mass motion along the sense axis 72. In the illustrative embodiment depicted, for example, the lower torquer electrode 86 can be positioned on or in the lower substrate 16 of the gyroscope 10, and can be oriented in a manner such that an upper face 108 thereof is positioned vertically adjacent to and parallel with the bottom surface 102 of the proof mass 14. The upper torquer electrode 90, in turn, can be positioned on or in the upper substrate 82 of the gyroscope 10, and can be oriented in a manner such that a lower face 110 thereof is positioned vertically adjacent to and parallel with the top surface 106 of the proof mass 14. A small, non-conductive gap 112,114 disposed between each torquer electrode 86,90 and laterally adjacent sense electrode 76,80 can be provided to electrically isolate the sense electrodes 76,80 from the torquer electrodes 86,90.

During operation, the Coriolis force resulting from rotational motion of the gyroscope 10 about the input axis 18 as well as any quadrature forces resulting from irregularities in the drive system cause the first and second proof masses 12,14 to move out-of-plane with respect to the sense electrodes 74,76. Such out-of-plane displacement causes a change in the charge on the proof mass 14, producing a current at the input node 94 of the charge amplifier 92.

Based on the magnitude of the voltage $V_{sense}$ outputted from the charge amplifier 92, the rebalancing voltages applied to the torquer electrodes 86,90 can be adjusted to counter the out-of-plane displacement of the proof mass 14, producing an electrostatic force $F_1, F_2$ that acts to maintain a fixed capacitive distance $D_1, D_2$ between the sense electrodes 76,80 and proof mass 14. If, for example, the sensing system detects out-of-plane motion of the proof mass 14 in an upward direction, a rebalancing voltage applied to the lower torquer electrode 86 can be configured to exert a downwardly directed electrostatic force $F_1$ on the proof mass 14. In similar fashion, a rebalancing voltage applied to the upper torquer electrode 90 can be configured to exert a downwardly directed electrostatic force $F_2$ on the proof mass 14, as shown, due to the time-varying characteristics of the voltage. In some embodiments, a rebalancing voltage simultaneously applied to both of the lower and upper torquer electrodes 86,90 can be configured to exert multiple rebalancing forces $F_1, F_2$ on the proof mass 14 at the same time, providing an enhanced level of symmetry to the force rebalancing process.

While the illustrative embodiment depicted in FIG. 2 utilizes multiple sense electrodes 74,76,78,80 and torquer electrodes 84,86,88,90 both below and above each of the proof masses 12,14, it should be understood that the gyroscope 10 could be configured to function using only a single torquer electrode and sense electrode for each proof mass 12,14. In certain embodiments, for example, the gyroscope 10 may include a single torquer electrode positioned above each proof mass 12,14, and a single sense electrode positioned below each proof mass 12,14. An opposite arrangement wherein the sense and torquer electrodes are positioned, respectively, above and below each of the proof masses 12,14 can also be employed. In some embodiments, and as described below with respect to FIGS. 5-7, multiple torquer electrodes can be positioned on or in the lower and/or upper substrates 16,82 to simultaneously and separately compensate for both Coriolis forces and quadrature-related forces on each of the proof masses 12,14, if desired.

Figure 3:
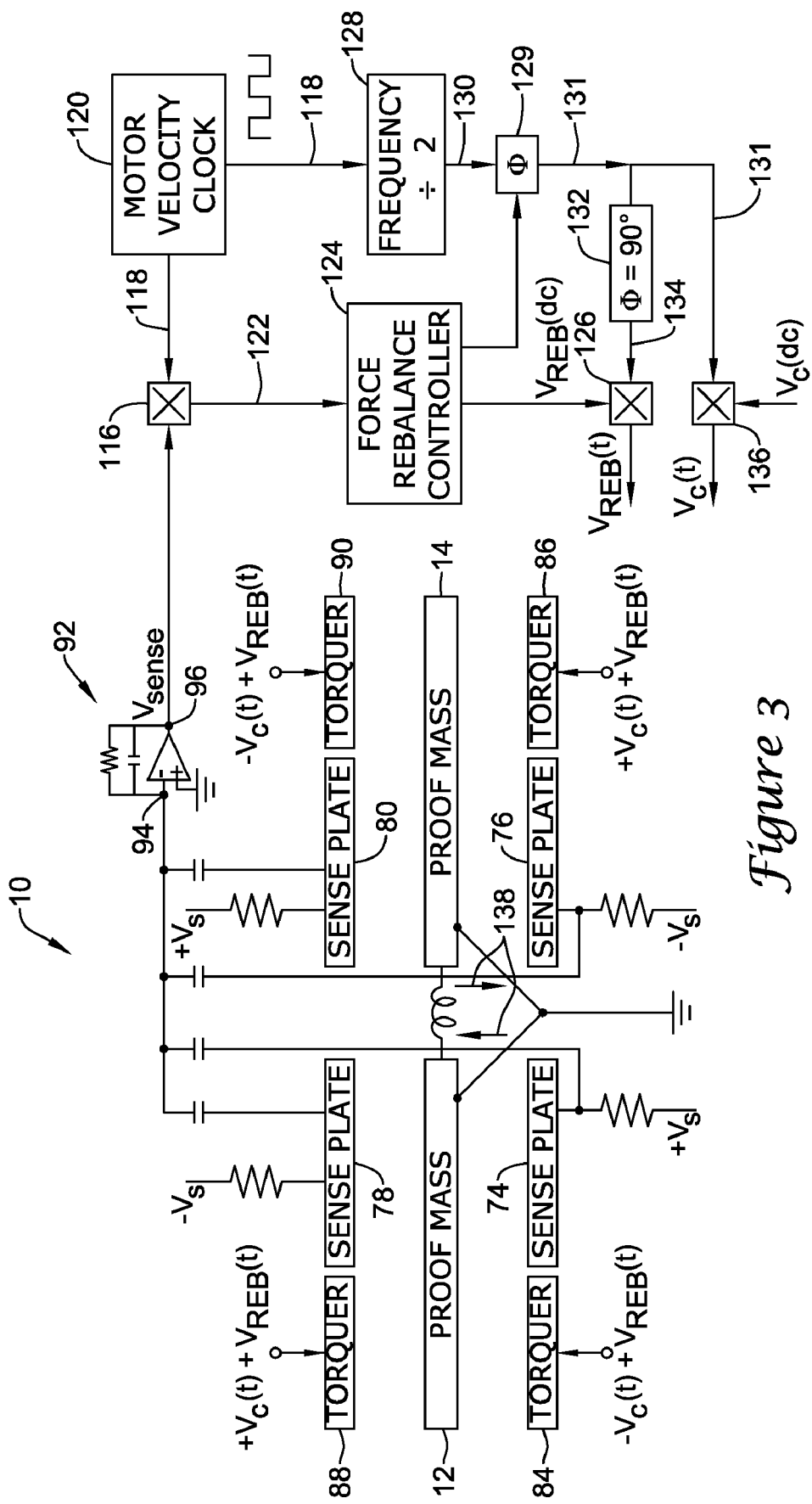
FIG. 3 is a representation of a simplified electromechanical block diagram showing an illustrative force rebalancing control loop for use in controlling the MEMS gyroscope of FIGS. 1-2.

FIG. 3 represents a simplified electromechanical block diagram showing an illustrative force rebalancing control loop for use in controlling the MEMS gyroscope 10 of FIG. 1. As shown in FIG. 3, the sense voltage $V_{Sense}$ outputted from the charge amplifier 92 can be fed to a demodulator 116, which demodulates the sense voltage $V_{sense}$ output signal from the charge amplifier 92 with the output signal 118 from the drive motor velocity clock 120, producing a signal 122 having the sum and difference of the frequencies of the two input signals. The resultant voltage signal 122 is then fed to a force rebalance controller 124 (e.g. a proportional-plus-integral-plus-derivative (PID) controller) having various force rebalance control logic (e.g. gain amplifier, phase shifter, filters, control variables, etc.), which, in turn, outputs a DC rebalancing voltage $V_{REB}(dc)$.

To reduce the effects of feedthrough, the DC rebalancing voltage $V_{REB}(dc)$ outputted by the force rebalance controller 124 can be fed to a second mixer 126, which modulates the DC rebalancing voltage $V_{REB}(dc)$ with the motor velocity clock signal 118 to produce a time-varying rebalancing voltage $V_{REB}(t)$. To disassociate the rebalancing voltage $V_{REB}(t)$ signal from the motor velocity clock signal 118, the angular frequency (ω) of the motor velocity clock signal 118 can be reduced by a scale factor of 2 using a frequency divider 128, thus outputting a signal 130 having a frequency half that of the motor velocity clock signal 118. The force rebalancing controller 124 can output a phase adjust signal Φ at block 129, which, when later applied to the DC rebalancing voltage $V_{REB}(dc)$ signal as discussed below, can be used to null the Coriolis and quadrature forces simultaneously.

The frequency divided and phase adjusted signal 131 outputted at block 129 can be fed to a phase shifter 132 that offsets the phase of the signal 131 by 90°, or by some other desired amount. The phase shifted signal 134 can then be fed to the mixer 126 and combined with the DC rebalancing voltage $V_{REB}(dc)$ outputted from the force rebalance controller 124, producing a time-varying rebalancing voltage $V_{REB}(t)$ signal component having a frequency half that of the motor velocity clock signal 118. By modulating the rebalancing voltage $V_{REB}(t)$ at half the motor frequency (ω) of the drive system, the effects of electrical feedthrough within the system can be significantly diminished since the sense pickoff electronics used to measure motor displacement typically use phase sensitive detection at the motor frequency (ω), and thus are not as sensitive to signals at half the motor frequency.

As can be further seen in FIG. 3, the output signal 131 from block 129 can also be combined with an external DC carrier voltage $V_C(dc)$ signal via a mixer 136, producing a time-varying carrier voltage $V_C(t)$ signal component. The net rebalancing voltage V(t) applied to each of the torquer electrodes 84,86,88,90 will typically comprise the sum of the time-varying carrier voltage $V_C(t)$ and rebalancing voltage $V_{REB}(t)$ signal components, and can be expressed generally by the formula:

$$V(t) = V_C sq\left(\frac{\omega t}{2}\right) + V_{REB} sq\left(\frac{\omega t}{2} + \frac{\pi}{2}\right) \quad (1)$$

where:

$V_C$ is the time-varying carrier voltage signal component;

$V_{REB}$ is the time-varying rebalancing signal component;

ω is the angular frequency of the motor mode motion of the proof masses; and sq(θ) represents a square wave with phase θ and amplitudes of ±1.

Figure 4:
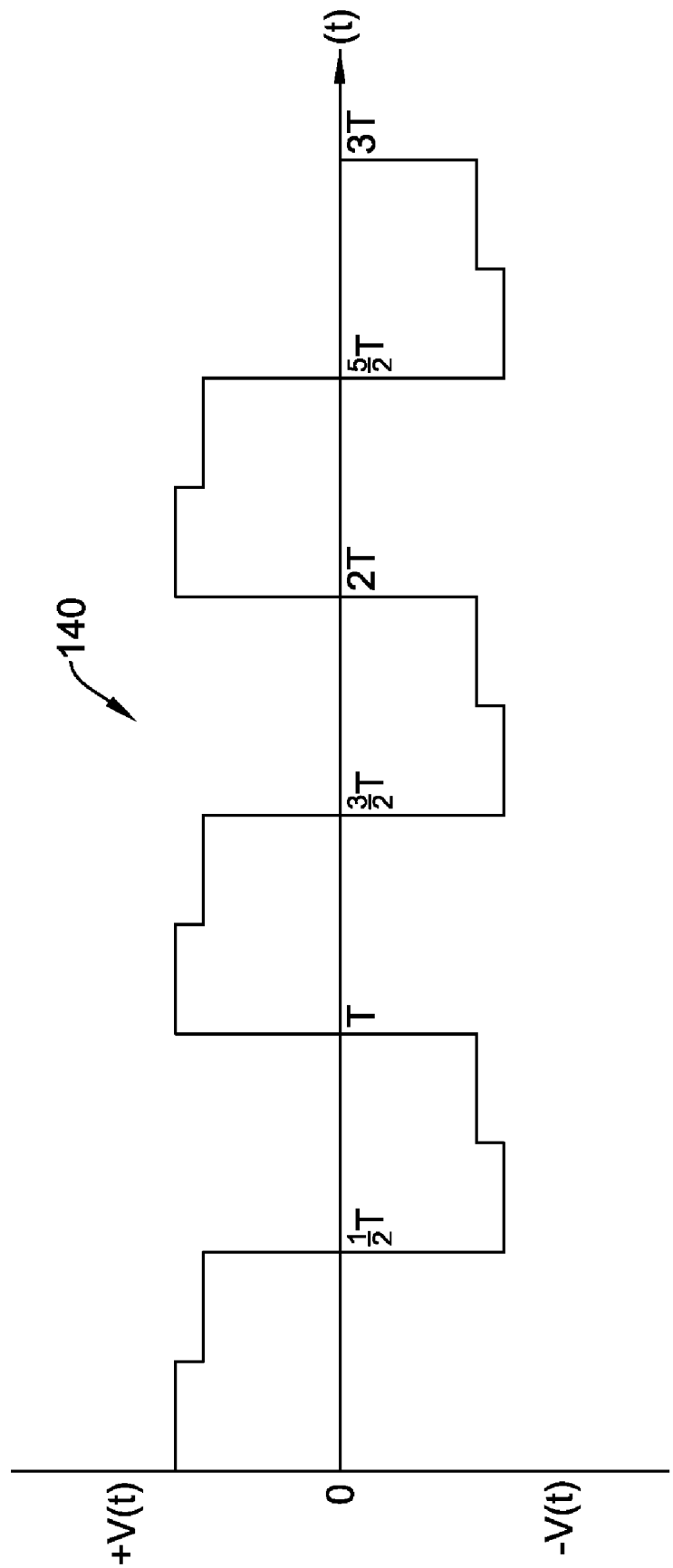
FIG. 4 is a representation of a time-varying waveform for the rebalancing voltage signal applied to the torquer electrodes.

As can be seen from Equation (1) above, the rebalancing voltage V(t) applied to each of the torquer electrodes 84,86, 88,90 thus includes a square-wave carrier voltage $V_C(t)$ signal component, and a square-wave rebalancing voltage $V_{REB}(t)$ signal component that is 90° out-of-phase with the carrier voltage $V_C(t)$ signal component. A representation of the waveform produced by the above Equation (1) can be seen in FIG. 4, which shows a modified square wave signal 140 produced by the sum of the carrier voltage $V_C(t)$ signal component and rebalancing voltage $V_{REB}(t)$ signal component.

The application of the rebalancing voltages V(t) to the torquer electrodes 84,86,88,90 produces a time-varying electrostatic rebalancing force on each of the proof masses 12,14 that acts to constrain differential sense resonant mode motion in the direction indicated generally by the up/down arrows 138 in FIG. 3. The component of the electrostatic rebalancing force $F_y$ induced on the proof masses 12,14 along the sense axis 72 as a result of the applied voltage V(t) of Equation (1) can be expressed generally by the following equation:

$$F_y = \frac{1}{2}\frac{dC}{dy}V^2 = \frac{1}{2}\frac{dC}{dy}[V_C^2 + V_{REB}^2 + 2V_CV_{REB}sq(\omega t)]; \quad (2)$$

is the derivative of capacitance of the torquer electrode with respect to proof mass motion along the sense axis 72.

As can be seen from Equation (2) above, the AC component of the electrostatic rebalance force $F_y$ is linear in the rebalancing voltage $V_{REB}$, thus simplifying the control electronics used by the force rebalance controller 124. Moreover, the AC component of the electrostatic rebalancing force $F_y$ is also at the motor frequency ($\omega$) of the drive system, as required for electrostatically nulling quadrature and Coriolis forces which are at the motor frequency $\omega$.

The phase of the rebalance force $F_y$ can be varied by adjusting the phase of the carrier voltage $V_C(t)$ and/or rebalancing voltage $V_{REB}(t)$ signal components of the rebalancing voltage V(t), allowing the selective rebalancing or control of the Coriolis and/or quadrature-related forces. In certain embodiments, for example, the selective control of the Coriolis force and quadrature forces can accomplished, for example, by varying the phase $\Phi$ of the rebalancing voltage $V_{REB}(t)$ via the force rebalance controller 124, by using a separate phase shifter for the carrier voltage $V_C(t)$ signal component (e.g. at the input to mixer 136), or by other suitable means. While the rebalancing voltage $V_{REB}(t)$ will typically be maintained 90° out-of-phase with the motor velocity clock signal 118, it should be understood that the rebalancing voltage $V_{REB}(t)$ could be offset by other amounts, if desired.

The force rebalance controller 124 will typically include control electronics adapted to operate over a relatively high control loop bandwidth while injecting relatively low levels of noise into the rebalancing voltage $V_{REB}(t)$ signal component, allowing the gyroscope 10 to accurately detect Coriolis forces across a wide dynamic range. In certain embodiments, for example, the noise level should be such that rotation rates as low as 0.01 deg/hr and as high as 500 deg/sec can be accurately sensed. The dynamic range of the gyroscope 10 may vary, however, depending on the particular application.

By operating the gyroscope 10 as a null detector instead of measuring voltage resulting from proof mass displacement, the gyroscope 10 can be configured to operate over greater dynamic ranges than many convention MEMS gyroscopes. Moreover, bias stability often caused by the phase shift of the quadrature motion produced by damping of the sense resonant mode can be further improved by force rebalancing the proof masses 12,14, in some cases by two or more orders of magnitude. Since the output signal is a direct measure of the Coriolis force, and is therefore independent of the resonant frequencies of the gyroscope 10, the occurrence of scale factor errors can also be significantly reduced by force rebalancing the proof masses 12,14. Other factors such as sensor reliability, sensor life, and long term drift may also be improved in certain circumstances.

Figure 5:
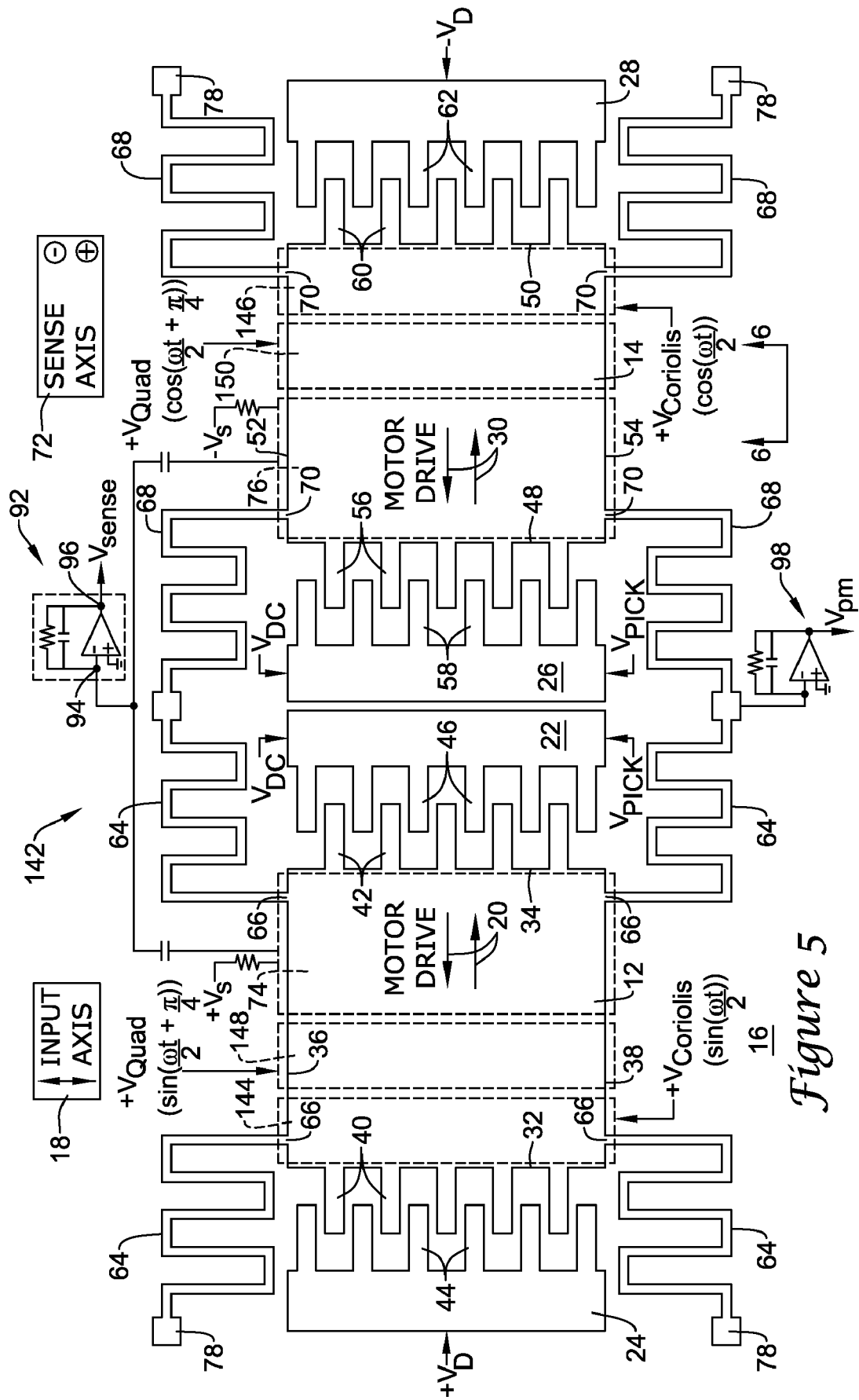
FIG. 5 is a schematic view showing another illustrative MEMS-type gyroscope utilizing separate torquer electrodes for simultaneously nulling Coriolis and quadrature phases of sense axis motion.

FIG. 5 is a schematic view of an illustrative MEMS-type gyroscope 142 in accordance with another exemplary embodiment of the present invention employing separate electrodes for simultaneously controlling both the Coriolis and quadrature phases of the sense axis motion. Gyroscope 142 is similar to the gyroscope 10 described above, with like elements in the drawings being numbered in like fashion. In the illustrative embodiment of FIG. 5, however, the gyroscope 142 includes a first set of electrodes 144,146 adapted to mechanically null Coriolis-related motion of the proof masses 12,14 along the sense axis 72, and a second set of electrodes 148,150 adapted to mechanically null quadrature-related motion of the proof masses 12,14 along the sense axis 72.

The torquer electrodes 144,146,148,150 can be configured similar to the torquer electrodes 84,86 described above with respect to FIGS. 1-2, each comprising a thin rectangular-shaped electrode plate positioned underneath at least a portion of the proof masses 12,14. In some embodiments, a separate set of Coriolis-related torquer electrodes 152,154 and quadrature-related torquer electrodes 156,158 (see FIGS. 6-7) can be further positioned above each of the proof masses 12,14 to control of Coriolis and quadrature forces from a position adjacent the proof masses 12,14.

To simultaneously control both the Coriolis and quadrature forces on the proof masses 12,14, the gyroscope 142 may utilize multiple force rebalancing control loops, each configured to produce a separate rebalancing voltage signal for independently controlling the first set of torquer electrodes 144,146,152,154 and the second set of torquer electrodes 148,150,156,158. In the illustrative embodiment of FIG. 5, for example, time-varying rebalancing voltages $V_{Coriolis}(\sin(\omega t/2))$, $C_{Coriolis}(\cos(\omega t/2))$ applied to the first set of torquer electrodes 144,146,152,154 can be utilized to electrostatically null any Coriolis-related motion of the proof masses 12,14 along the sense axis 72. Separate time-varying rebalancing voltages $V_{quad}(\sin(\omega t/2+\pi/4))$, $V_{quad}(\cos(\omega t/2+\pi/4))$ applied to the second set of torquer electrodes 148,150,156, 158, in turn, can be utilized to electrostatically null any quadrature-related motion of the proof masses 12,14 along the sense axis 72.

Figure 6:
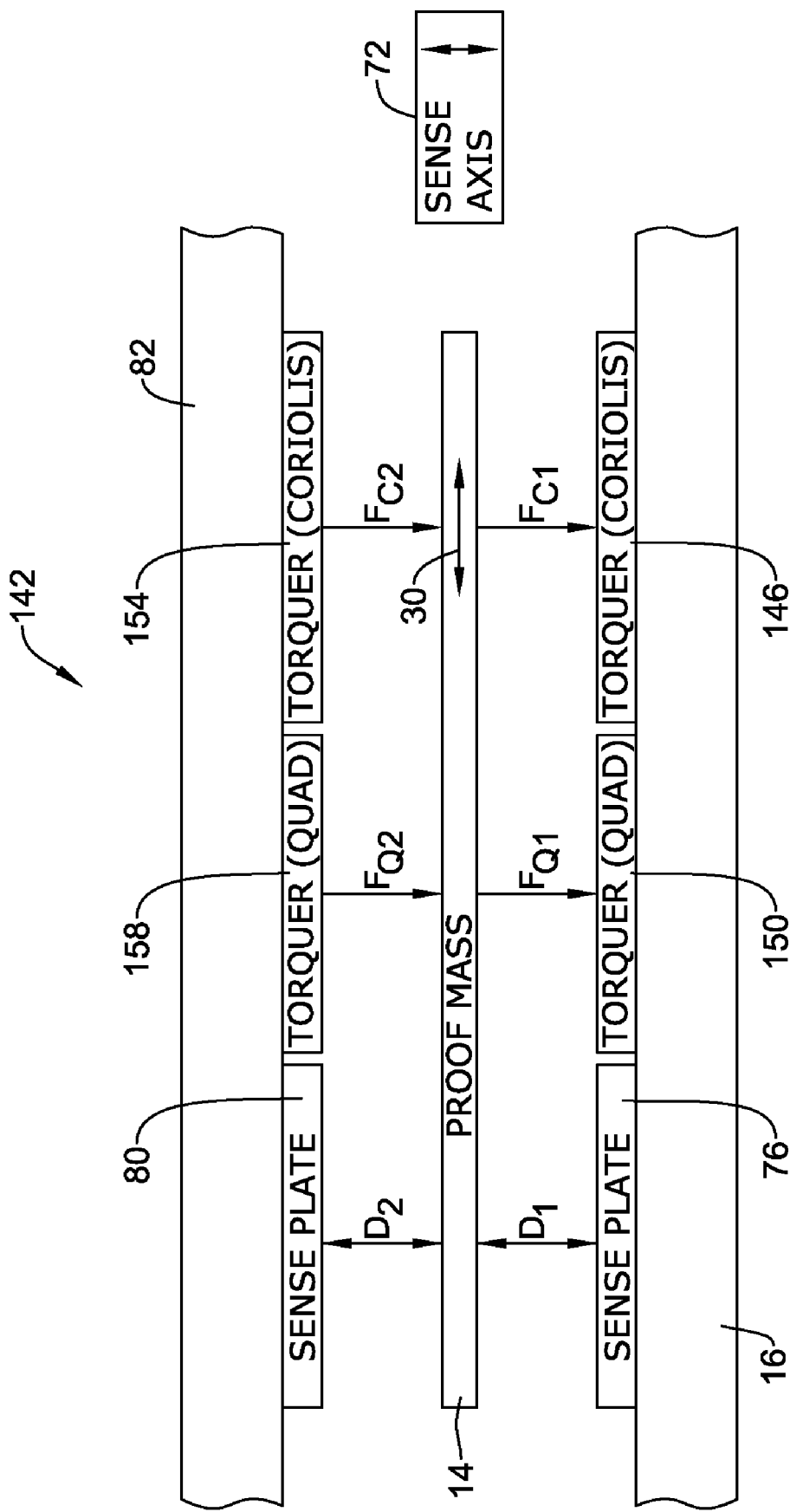
FIG. 6 is a side cross-sectional view showing the illustrative gyroscope along line 6-6 of FIG. 5.

FIG. 6 is a side cross-sectional view illustrating the operation of the sense electrodes and torquer electrodes of FIG. 5 in greater detail. As shown in FIG. 6, the first set of lower and upper torquer electrodes 146,154 can be positioned on or in the substrates 16,82 in a manner so as to produce electrostatic forces $F_{C1}, F_{C2}$ on the proof masses 12,14 that act to mechanically null any Coriolis-related proof mass motion along the sense axis 72. In similar fashion, the second set of lower and upper torquer electrodes 150,158 can be positioned on or in the substrates 16,82 in a manner so as to produce additional electrostatic forces $F_{Q1}, F_{Q2}$ on the proof masses 12,14 that act to mechanically null any quadrature-related proof mass motion along the sense axis 72.

Figure 7A:
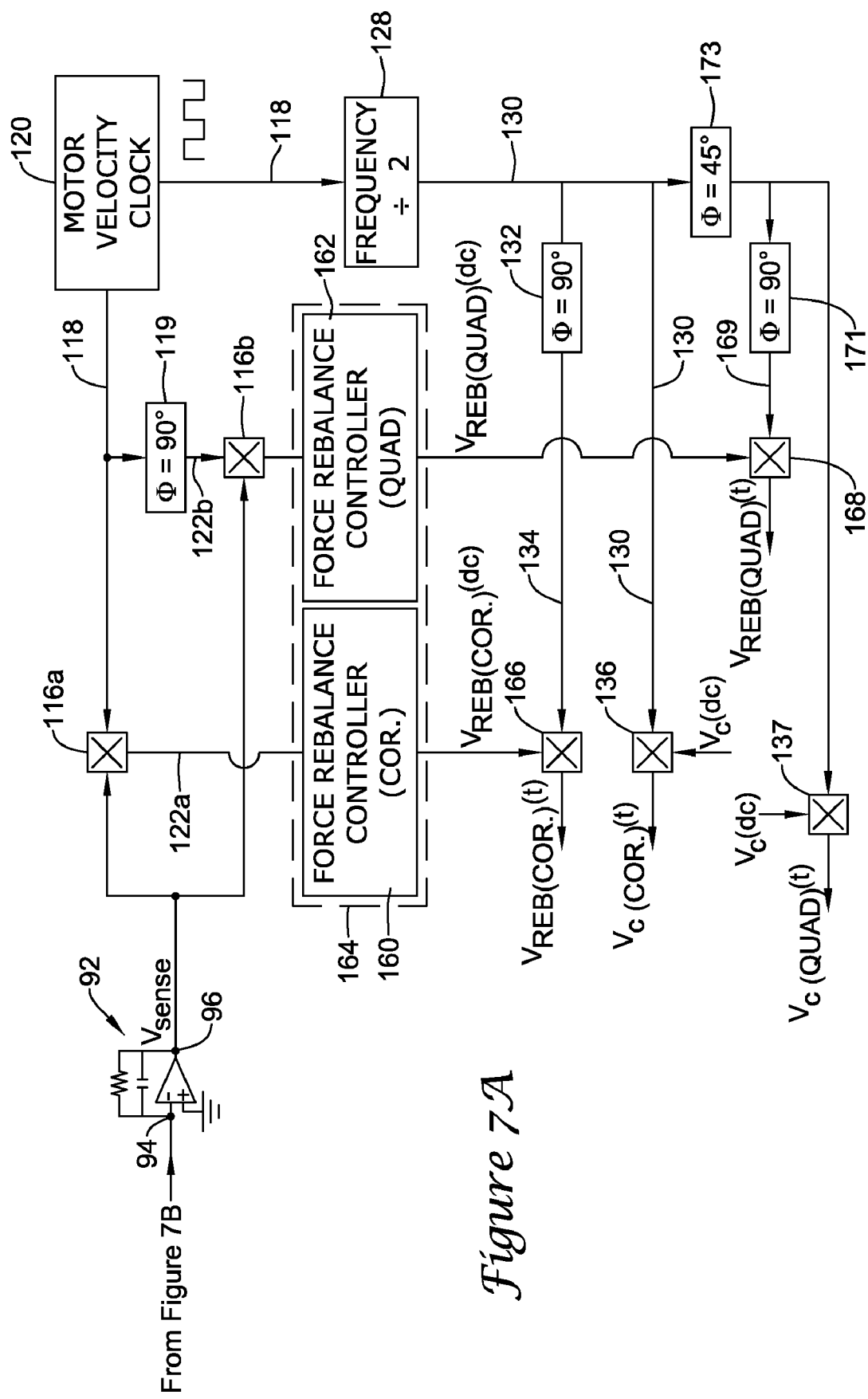
FIGS. 7A-7B are a representation of a simplified electromechanical block diagram showing the use of multiple force rebalancing control loops for controlling the MEMS gyroscope of FIGS. 5-6.
Figure 7B:
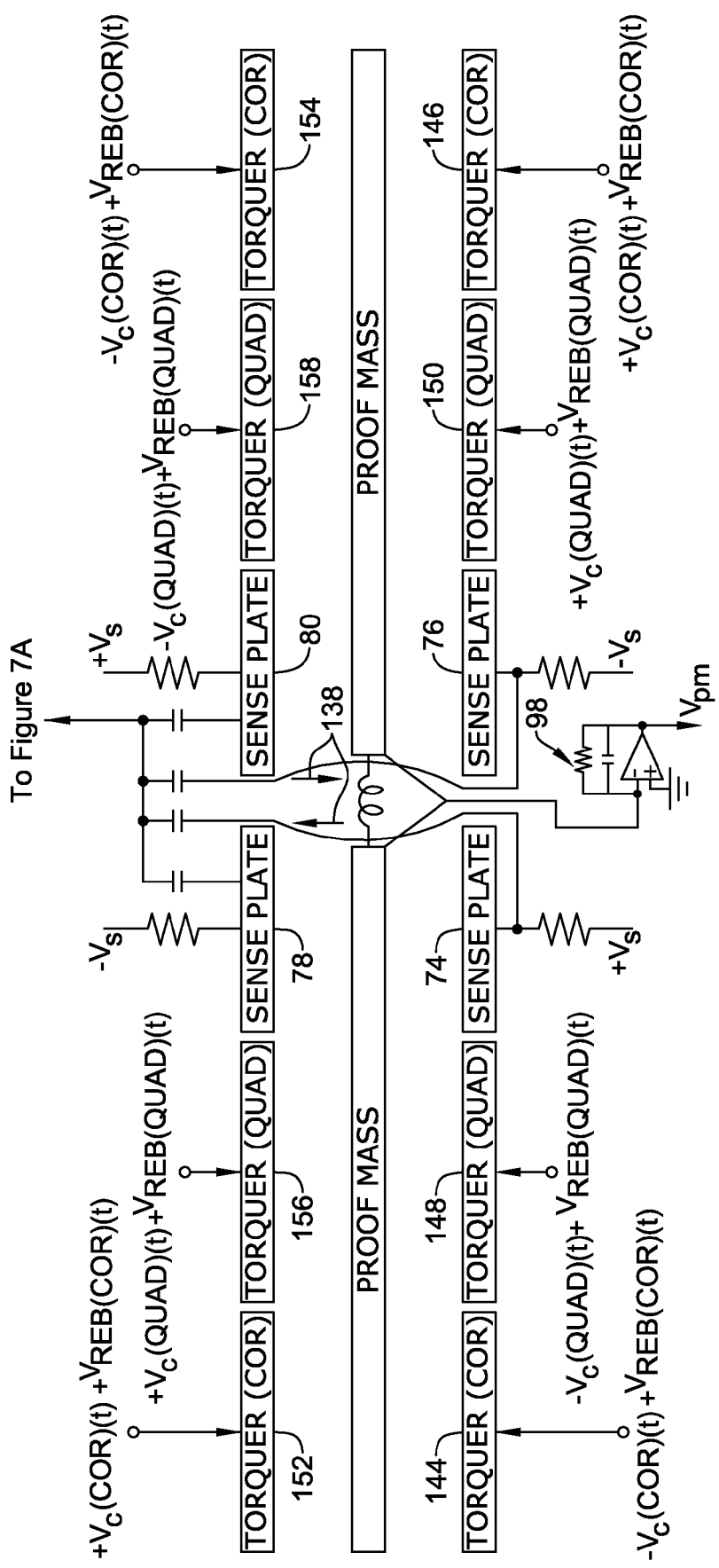

FIGS. 7A-7B represent a simplified electromechanical block diagram showing the use of multiple force rebalancing loops for controlling the MEMS gyroscope 142 of FIGS. 5-6. As shown in FIG. 7A, the output sense voltage $V_{sense}$ outputted from the charge amplifier 92 can be fed to a first demodulator 116a, which demodulates the sense voltage $V_{sense}$ with the output signal 118 from the drive motor velocity clock 120, producing a first voltage signal 122a. The sense voltage $V_{sense}$ outputted from the charge amplifier 92 can also be fed to a second demodulator 116b, which demodulates the output signal 118 from the drive motor velocity clock 120, producing a second voltage signal 122b. The second voltage signal 122a can be made 90° out-of-phase with the first signal 122a via a phase-shifter 119, as shown.

The first voltage signal 122a outputted from demodulator 116a can be fed to a first force rebalance controller 160 adapted to output a first DC rebalancing voltage $V_{REB(COR)}$ (dc) that can be used by the gyroscope 142 to null any Coriolis-related proof mass motion. The second voltage signal 122b outputted from demodulator 116b, in turn, can be fed to a second force rebalance controller 162 adapted to output a second DC rebalancing voltage $V_{REB}$(QUAD)(dc) that can be used by the gyroscope 142 to null any quadrature-related proof mass motion. The first and second force rebalance controllers 160,162 can be implemented as either physically separate controllers, or can be combined into a single controller, as indicated generally by dashed box 164. In some embodiments, for example, a multiple-input multiple-output (MIMO) controller can be used to control both the quadrature and Coriolis rebalancing voltages $V_{REB(QUAD)}$(dc), $V_{REB(COR)}$(dc), if desired.

Once fed through various control logic within the force rebalance controllers 160,162, the first and second DC rebalancing voltages $V_{REB(COR)}$(dc), $V_{REB(QUAD)}$(dc) can each be fed to a corresponding mixer 166,168, which modulates the DC voltages to produce time-varying rebalancing voltages $V_{REB(COR)}$(t) and $V_{REB(QUAD)}$(t), respectively. The DC rebalancing voltage $V_{REB(COR)}$(dc), for example, can be mixed with phase adjusted signal 134 outputted by block 132, as shown. The DC rebalancing voltage $V_{REB(QUAD)}$(t), in turn, can be mixed with the output signal 169 from phase adjust block 171, as shown. A second phase shift at block 173 can offset the quadrature rebalancing voltage $V_{REB(COR)}$(t) by 45°, as further shown in FIG. 7A. The rebalancing voltages $V_{REB(COR)}$(t) and $V_{REB(QUAD)}$(t) can then each be combined with modulated carrier voltages $V_C$(t) produced at mixers 136 and 137, respectively, which can then applied to the various torquer electrodes as shown in FIG. 7B.

During operation, the application of the rebalancing voltages $V_{REB(COR)}$(t) and $V_{REB(QUAD)}$(t) on the torquer electrodes produces a number of time-varying electrostatic rebalancing forces on each of the proof masses 12,14 which act to constrain differential sense resonant mode motion 138 due to the Coriolis and quadrature forces. By employing multiple force rebalancing control loops, the gyroscope 142 can be configured to simultaneously null both the Coriolis and quadrature phases of proof mass motion along the sense axis 72.

Figure 8A:
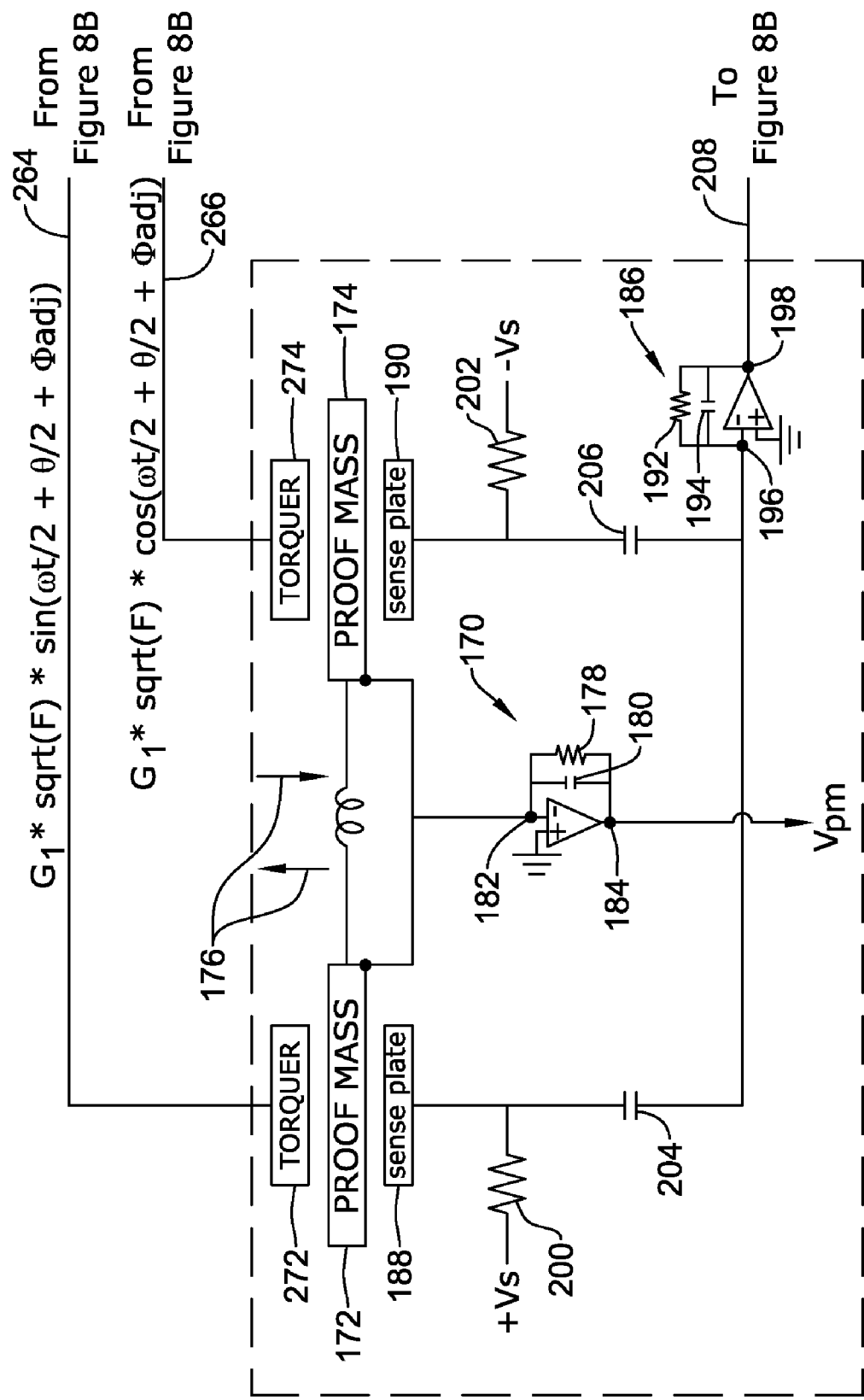
FIGS. 8A-8B is a representation of a simplified electromechanical block diagram showing another illustrative force rebalancing control loop for controlling a MEMS inertial sensor using sinusoidal rebalancing voltages applied to the torquer electrodes.
Figure 8B:
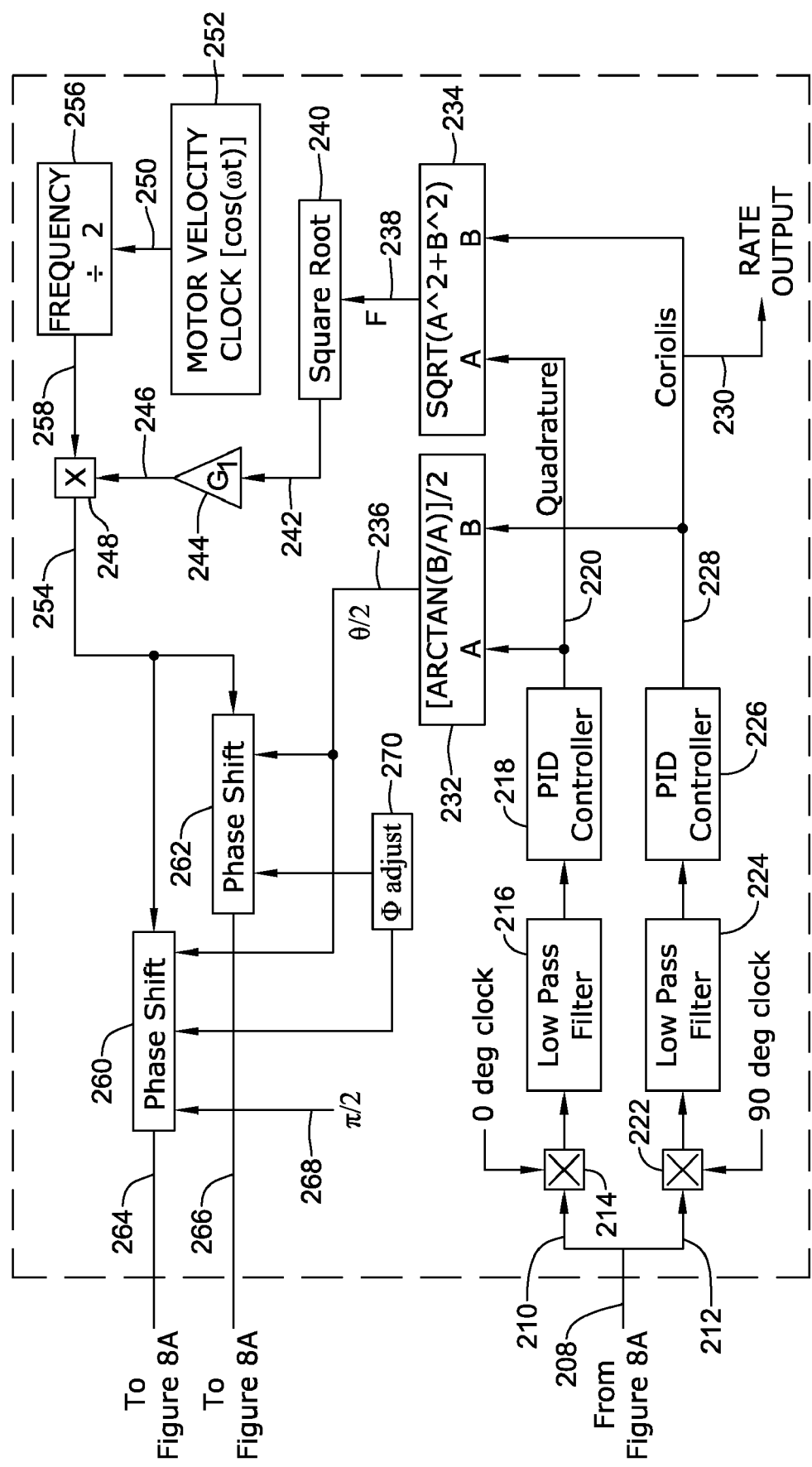

FIGS. 8A-8B represent a simplified electromechanical block diagram showing another illustrative force rebalancing control loop for controlling a MEMS inertial sensor similar to that depicted in FIGS. 1-2 using sinusoidal rebalancing voltages applied to the sense electrodes. As shown in FIG. 8A, the sense electronics for the inertial sensor can include a first amplifier 170 connected to each of the proof masses 172,174 of the inertial sensor and adapted to output a voltage signal $V_{PM}$ based on currents received from the proof masses 172,174. The first amplifier 170 may comprise, for example, a charge amplifier having a large value resistor 178 and capacitor 180 connected across the input and output nodes 182,184 of the amplifier 170, which act to maintain the proof masses 172,174 at virtual ground.

The sense electronics for the inertial sensor can further include a second amplifier 186, which can be configured to amplify current signals received from a number of sense electrodes 188,190 due to out-of-plane movement of the proof masses 172,174 in the sense axis direction 176. The second amplifier 186 can comprise, for example, a charge amplifier having a large value resistor 192 and capacitor 194 connected across the input and output nodes 196,198 of the amplifier 186.

A DC sense bias voltage $V_S$ applied to each of the sense electrodes 188,190 can be utilized to induce a charge on the proof masses 172,174 proportional to the capacitance between the respective sense electrode 188,190 and proof mass 172,174. To help balance the sense bias input to the second amplifier 186 at or about zero, the sense bias voltages $V_S$ applied to each sense electrode 188,190 can have an opposite polarity from each other, and can be connected to a respective resistor 200,202 and capacitor 204,206, as shown. In certain embodiments, for example, a sense bias voltage $V_S$ of +5V and −5V, respectively, can be applied to each of the sense electrodes 188,190 to ensure that the output signal from the second amplifier 186 is sensitive to only differential mode motion of the proof masses 172,174 along the sense axis 176.

FIG. 8B represents a simplified electromechanical block diagram showing the feedback control electronics (e.g. digital signal processing electronics) that can be used to force rebalance the proof masses 172,174 shown in FIG. 8A. As further shown in FIG. 8B, the amplified signals 208 received from the second amplifier 186 can be split into two separate signals 210,212 that are used by the control electronics to compensate for both the quadrature and Coriolis forces on the proof masses 172,174. A first signal 210 from the amplifier 186, for example, can be fed to a first demodulator 214, low-pass filter 216, and PID controller 218, producing a quadrature signal 220 that can be later used to compensate for quadrature-related motion of the proof masses 172,174. A second signal 212 from the amplifier 186, in turn, can be fed to a second demodulator 222, low-pass filter 224, and PID controller 226, producing a Coriolis signal 228 that can be later used to compensate for Coriolis-related motion of the proof masses 172,174, and which provides the desired rate output signal 230 of the inertial sensor. The second demodulator 222 can be configured to demodulate the second signals 212 from the amplifier 186 90° out-of-phase with the signals 210 fed to the first demodulator 214. In some embodiments, for example, the first demodulator 214 may demodulate amplified signal 210 using a sine wave function whereas the second demodulator 222 may demodulate amplified signal 212 using a cosine function.

Once the amplified signals 210,212 are modulated, filtered, and the compensated, the resultant signals 220,228 can then be passed through a number of function routines 232,234, which process the two signals 220,228 to form a respective signal 236 and 238. A first function routine 232, for example, can be configured to determine the phase of the quadrature and Coriolis-related signals 220,228, producing an output signal 236 having a phase that is half (i.e. θ/2) that of the output signal 208 from the second amplifier 186. In some embodiments, the first function routine 232 can determine the phase based on the following expression:

$$\arctan\left(\frac{B}{A}\right)/2; \qquad (3)$$

where:
"B" is the Coriolis-related signal 228; and
"A" is the quadrature-related signal 220.

The second function routine 234, in turn, can be configured to determine the amplitude of the electrostatic rebalancing force F necessary to cancel the quadrature and Coriolis-related motions of the proof masses 172,174. In one such embodiment, for example, the second function routine 234 can be configured to determine the amplitude of the electrostatic force F based on the following expression:

$$\sqrt{A^2+B^2}; \quad (4)$$

where:

"B" is the Coriolis-related signal 228; and

"A" is the quadrature-related signal 220. The electrostatic force F determined from expression (4) above can then be fed to box 240, which takes the square root of the electrostatic force F. The resultant force signal 242 is then gain adjusted with a constant $G_1$ at box 244. The gain adjusted force signal 246 can then be fed to a mixer 248, which modulates the adjusted signal 246 with the clock signal 250 produced by the motor velocity clock 252 to produce a time-varying rebalancing voltage signal 254. To disassociate the rebalancing voltage signal 254 from the motor velocity clock signal 250, the angular frequency (ω) of the motor velocity signal 250 can be reduced by a scale factor of 2 using a frequency divider 256, thus outputting a signal 258 having a frequency half that of the motor velocity clock signal 250.

The rebalancing voltage signal 254 outputted from the mixer 248 can then be split and fed to a number of phase-shifters 260,262, which produce rebalancing voltage signals 264,266 that are 90° out-of-phase with each other. The component of the rebalancing voltage signal 254 fed to the first phase shifter 260, for example, can be phase shifted 90° (i.e. π/2) via signal 268, and has a frequency matching that of half the motor frequency ωvia signal 236. The component of the rebalancing voltage signal 254 fed to the second phase shifter 262, in turn, is maintained 90° out-of-phase with the first rebalancing signal 264, and also has a frequency matching that of half the motor frequency ωvia signal 236. In some embodiments, a phase adjuster 270 can be used to adjust the phase provided by the first and/or second phase shifters 260, 262, if desired.

As can be further seen by reference back to FIG. 8A, the time-varying rebalancing voltage signals 264,266 are then fed to a respective torquer electrode 272,274 in order to electrostatically null the Coriolis and quadrature forces on the proof masses 172,174. The first rebalancing voltage signal 264, for example, can be applied to a first torquer electrode 272 for canceling the Coriolis and quadrature forces on proof mass 172. The second rebalancing voltage signal 264, in turn, can be applied to a second torquer electrode 274 for canceling the Coriolis and quadrature forces on proof mass 174. By proper adjustment of the phases of the rebalancing voltage signals 264,266, these signals simultaneously control both the Coriolis and quadrature-related motions of the proof masses 12,14. Since the rebalancing voltage signals 264,266 fed to each corresponding electrode 272,274 are sinusoidal rebalancing voltages at half the motor frequency and 90° out-of-phase with each other and the electrostatic force is proportional to the square of the applied voltage, the resulting forces on the proof masses 172,174 are at the motor frequency and 180° out-of-phase with each other. Thus, the electrostatic rebalancing forces are able to null the differential motion of the proof masses 172,174 (i.e. the Coriolis and quadrature-related motions) at the motor frequency.

Figure 9A:
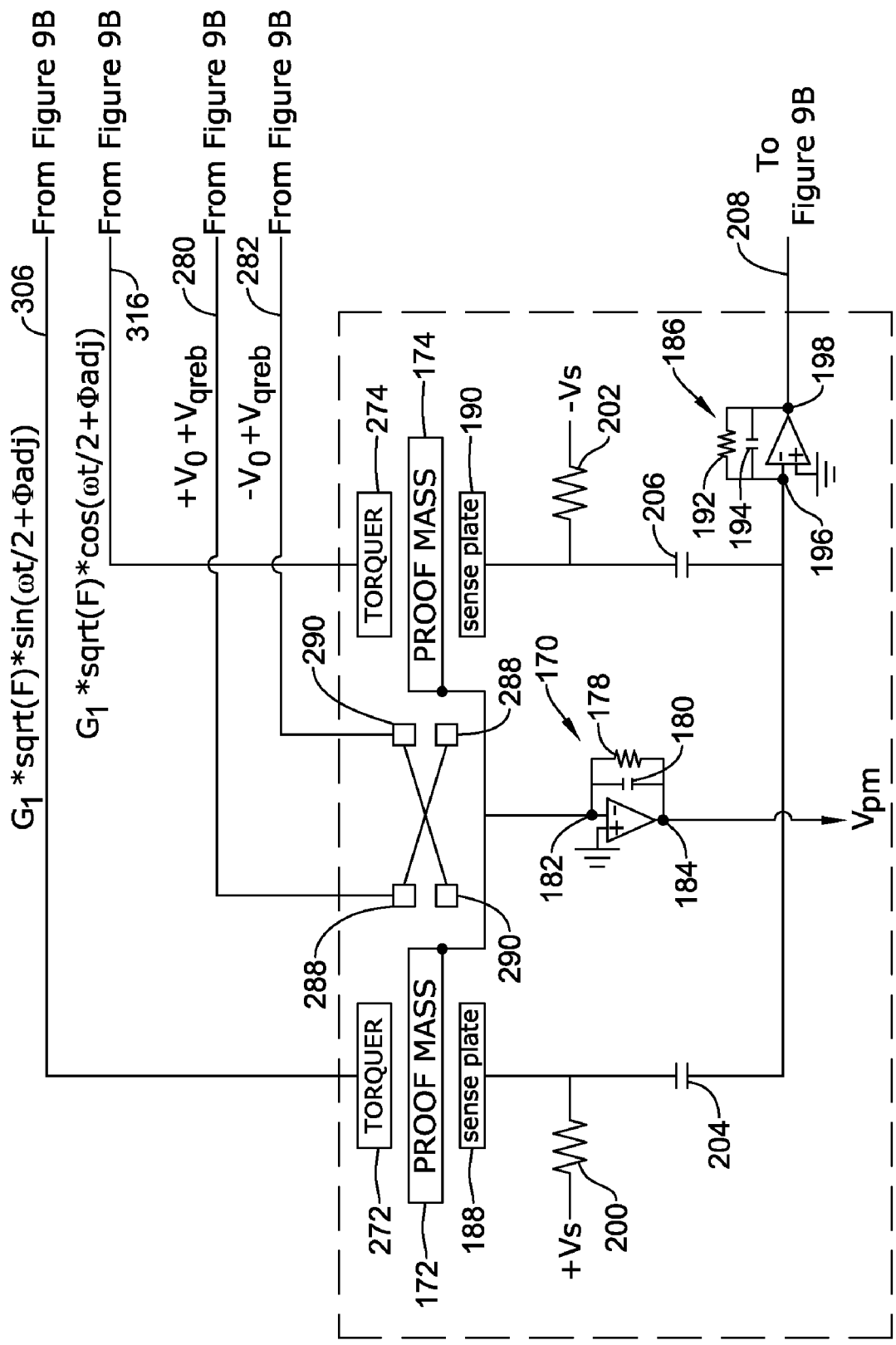
FIGS. 9A-9B is a representation of a simplified electromechanical block diagram showing the use of multiple force rebalancing control loops for controlling a MEMS inertial sensor using separate sinusoidal Coriolis and quadrature rebalancing voltages.
Figure 9B:
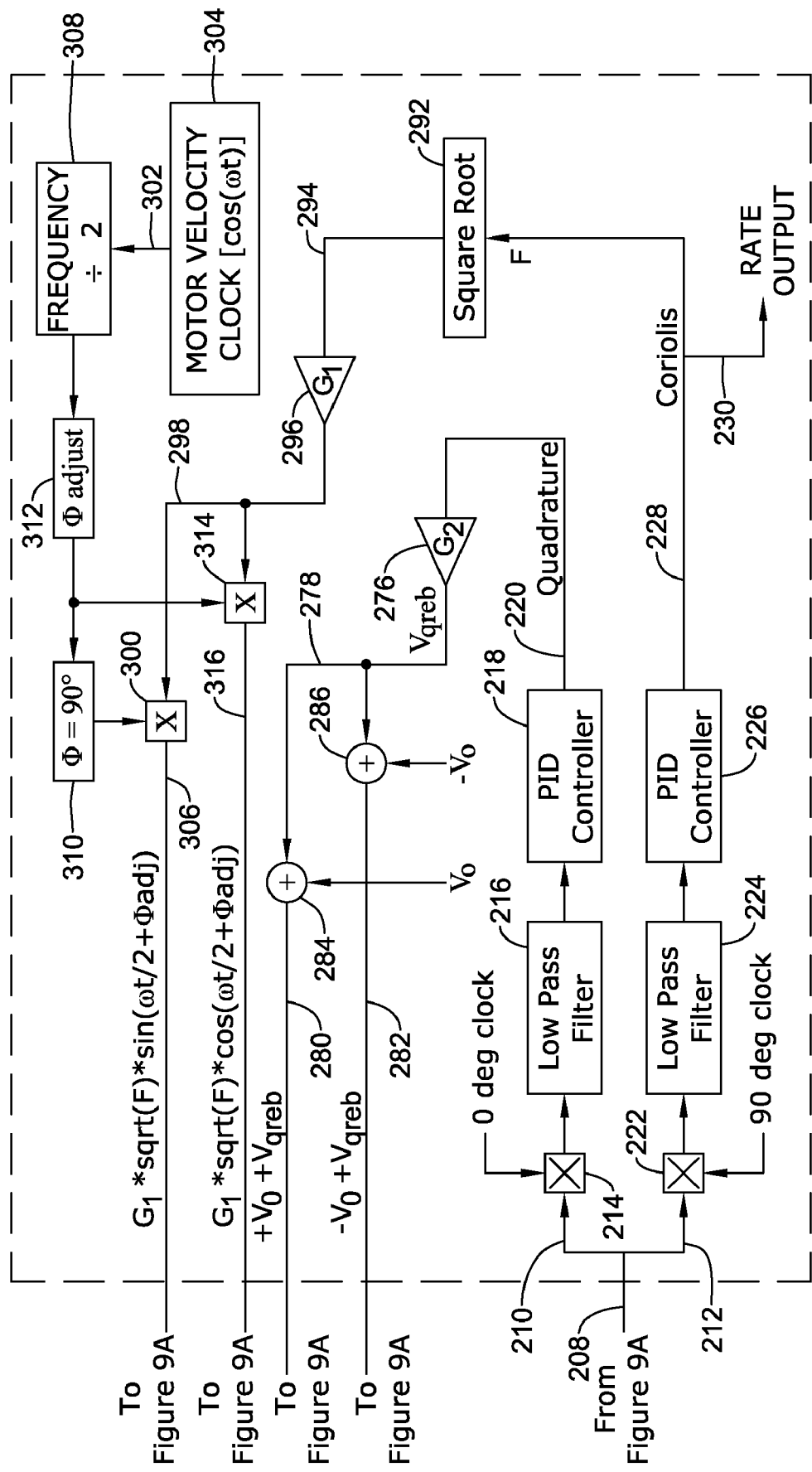

FIGS. 9A-9B represent a simplified electromechanical block diagram showing the use of multiple force rebalancing control loops for controlling a MEMS inertial sensor using separate sinusoidal Coriolis and quadrature rebalancing voltages. As shown in FIGS. 9A-9B, the sense electronics for the inertial sensor are similar to that depicted in FIGS. 8A-8B, with like elements labeled in like fashion.

In the illustrative embodiment of FIGS. 9A-9B, however, the quadrature and Coriolis-related signals 218,226 outputted from the PID controllers 218,226 are part of separate control loops, allowing the electronics to compensate for quadrature and Coriolis forces independently of each other. The quadrature signal 220 outputted from the PID controller 218 used to compensate for quadrature-related proof mass motion, for example, can be fed to its own gain adjuster 276, which adjusts the signal 220 by a constant $G_2$. The quadrature rebalancing voltage 278 outputted by gain adjuster 276 can then be split into two separate DC quadrature rebalancing signals 280,282 after adding bias voltage $V_0$ and $-V_0$ via adders 284,286, respectively. As can be seen by reference back to FIG. 9A, the quadrature rebalancing signals 280,282 can then be applied to a number of torquer electrodes 288,290 for electrostatically nulling any quadrature-related motion of the proof masses 172,174. In an in-plane gyroscope (IPG) configuration, for example, the torquer electrodes 288,290 can be placed above and below the proof masses 172,174 to electrostatically null quadrature related proof mass motion. Alternatively, in other configurations such as an out-of-plane gyroscope (OPG), the torquer electrodes 288,290 could be placed at other locations such as between the pickoff comb electrodes and/or drive comb electrodes.

As further shown in FIG. 9B, the Coriolis-related signal 228 outputted by the PID controller 226 used to compensate for Coriolis-related proof mass motion can be fed to box 292, which takes the square root of signal 228. The resulting signal 294 is then fed to a gain adjuster 296, which adjusts the gain with a constant $G_1$. The gain adjusted signal 298 can then be split and fed to a first mixer 300, which modulates the adjusted signal 298 with the clock signal 302 produced by the motor velocity clock 304 to produce a time-varying rebalancing voltage signal 306. The frequency of the rebalancing voltage signal 306 can be reduced by a scale factor of 2 using a frequency divider 308. The rebalancing voltage signal 306 can also be phase shifted by 90° using a phase shifter 310. In some embodiments, a second phase shifter 312 can be provided to vary the phase of the rebalancing voltage signal 306, if desired.

The gain adjusted signal 298 can be further fed to a second mixer 314, which modulates the signal 298 with the clock signal 302 produced by the motor velocity clock 304 to produce a second time-varying rebalancing voltage signal 316 that is 90° out-of-phase with the time-varying rebalancing voltage signal 306 outputted by the first mixer 300. If necessary, the phase adjuster 312 can be used to adjust the phase of the second time-varying rebalancing voltage signal 316. As further shown in FIG. 9A, the time-varying rebalancing voltage signals 306,316 are then fed to a respective torquer electrode 272,274 in order to electrostatically null the Coriolis forces on the proof masses 172,174.

Figure 10:
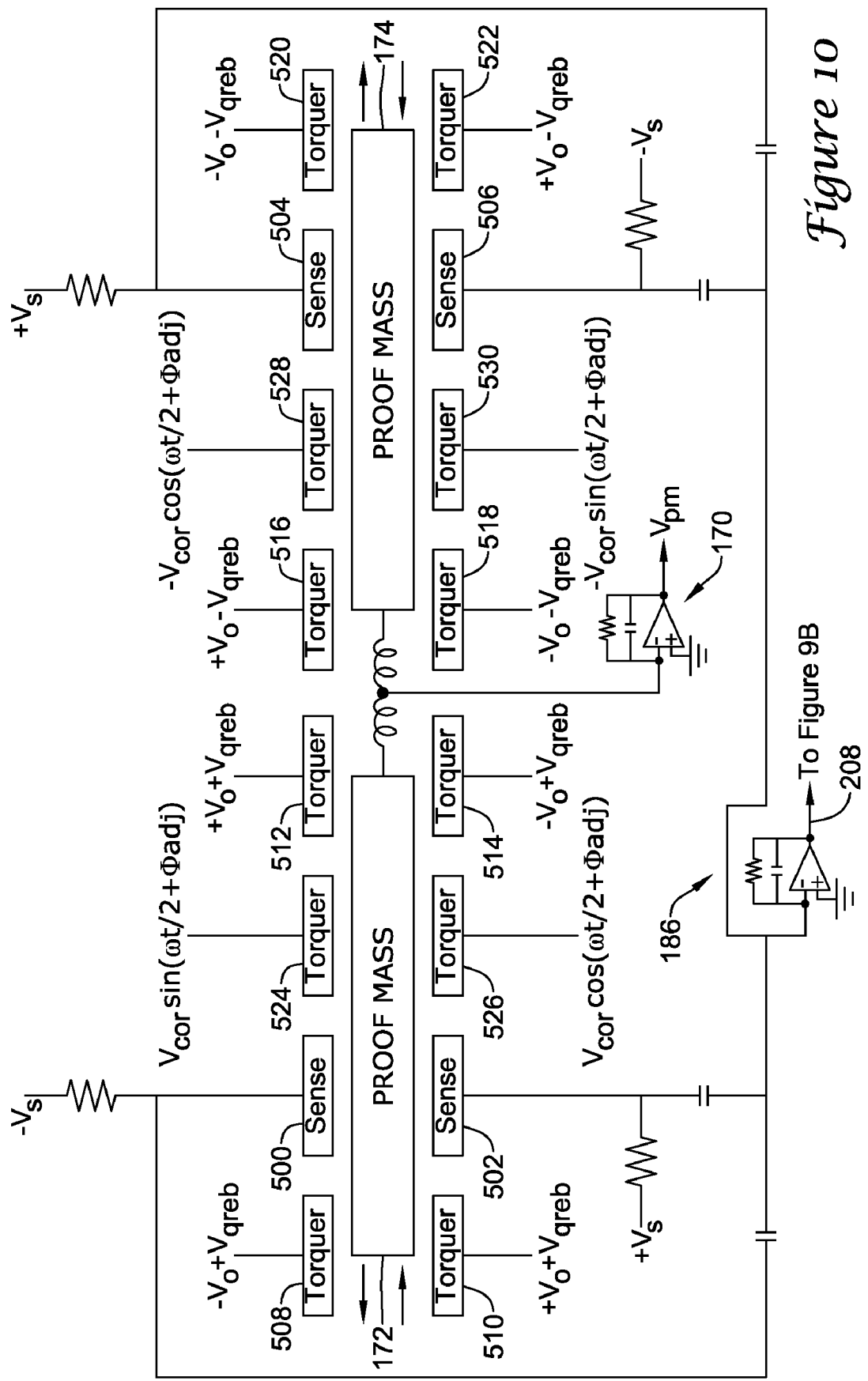
FIG. 10 is a side-cross-sectional view showing an illustrative sense and torquer electrode configuration for the MEMS inertial sensor of FIGS. 9A-9B.

FIG. 10 is a side cross-sectional view showing an illustrative sense and torquer electrode configuration for the MEMS inertial sensor of FIGS. 9A-9B. In an in-plane gyroscope configuration depicted in FIG. 10, the sense electrodes 500, 502,504,506 used for sensing motion of the proof masses 171,174 along the sense axis of the inertial sensor can be positioned both above and below each corresponding proof mass 172,174. For example, with respect to the first proof mass 172, an upper sense electrode 500 and lower sense electrode 502 each charged with opposite sense bias voltages $+V_S$ and $-V_S$, respectively, can be used to sense motion of the first proof mass 172 along the sense axis. In similar fashion, an upper sense electrode 504 and lower sense electrode 506 each charged with opposite sense bias voltages $-V_S$ and $+V_S$, respectively, can be used to sense motion of the second proof mass 174 along the sense axis.

In the illustrative embodiment of FIG. 10, two sets of upper and lower torquer electrodes can be provided for each respective proof mass 172,174 to null quadrature-related motion of the proof masses 172,174. With respect to the first proof mass 172, for example, a first set of upper and lower torquer electrodes 508,510 can be used to null quadrature-related motion during movement of the proof mass 172 in one direction along the drive axis whereas a second set of upper and lower torquer electrodes 512,514 can be used to null quadrature-related motion during movement of the proof mass 172 in the opposite direction. Similarly, a first set of upper and lower torquer electrodes 516,518 can be used to null quadrature-related motion during movement of the second proof mass 174 in one direction along the drive axis whereas a second set of upper and lower torquer electrodes 520,522 can be used to null quadrature-related motion during movement of the proof mass 174 in the opposite direction. Although two sets of torquer electrodes are shown for each proof mass 172,174, it should be understood that other numbers and/or configurations could be employed. In addition, the voltages applied to each of the torquer electrodes can also be varied from that depicted in FIG. 10.

A set of upper and lower torquer electrodes can be further provided for each proof mass 172,174 to null Coriolis-related motion of the proof masses 172,174 along the sense axis. With respect to the first proof mass 172, for example, an upper torquer electrode 524 and lower torquer electrode 526 can be used to null Coriolis-related motion of the proof mass 172 along the sense axis direction. In similar fashion, an upper torquer electrode 528 and lower torquer electrode 530 can be used to null Coriolis-related motion of the second proof mass 174 along the sense axis direction. The number and configuration of the torquer electrodes, including the voltages applied to the electrodes, can be varied from that depicted in FIG. 10.

Although MEMS-type in-plane gyroscopes (IPG's) are specifically depicted in the illustrative embodiments described herein, it should be understood that other types of inertial sensing devices can employ one or more features described herein. In certain embodiments, for example, the torquer electrodes and AC rebalancing forces could be utilized in conjunction with a MEMS-type out-of-plane gyroscope (OPG) such as that described in U.S. Pat. No. 7,036,373, entitled "MEMS Gyroscope With Horizontally Oriented Drive Electrodes," the contents of which are incorporated herein by reference in their entirety. In an out-of-plane gyroscope embodiment, the torquer electrodes can be configured to provide lateral electrostatic forces on the proof masses that can be used to null any motion along the sense axis due to the Coriolis and/or quadrature forces. As with an in-plane gyroscope, the output of the out-of-plane gyroscope is the rebalancing voltage used to provide the necessary feedback force to null the Coriolis and/or quadrature forces rather than the voltage induced by proof mass displacement.

Having thus described the several embodiments of the present invention, those of skill in the art will readily appreciate that other embodiments may be made and used which fall within the scope of the claims attached hereto. Numerous benefits of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A MEMS inertial sensor, comprising:
   one or more proof masses adapted to oscillate at a motor drive frequency;
   at least one sense electrode positioned adjacent to each of the one or more proof masses, the sense electrode adapted to sense proof mass motion along a sense axis perpendicular to a drive axis of the one or more proof masses; and
   a plurality of torquer electrodes positioned adjacent to each of the one or more proof masses, wherein the torquer electrodes comprise:
      one or more first torquer electrodes adapted to selectively control Coriolis-related motion of the one or more proof masses along the sense axis; and
      one or more second torquer electrodes adapted to selectively control quadrature-related motion of the one or more proof masses along the sense axis; and
      one or more time-varying rebalancing voltages applied to said torquer electrodes, the rebalancing voltages adapted to maintain a fixed capacitance between each sense electrode and its corresponding proof mass.

2. The MEMS inertial sensor of claim 1, wherein the time-varying rebalancing voltages includes an include one or more AC rebalancing voltages voltage.

3. The MEMS inertial sensor of claim 2, wherein the AC rebalancing voltages include voltage includes a rebalancing voltage signal component whose frequency is half of a motor drive frequency and a carrier voltage signal component whose frequency is half of a motor drive frequency, wherein said rebalancing voltage signal component is 90° out-of-phase with the carrier voltage signal component.

4. The MEMS inertial sensor of claim 2, wherein the AC rebalancing voltage is a sinusoidal rebalancing voltage.

5. The MEMS inertial sensor of claim 1, wherein the one or more time-varying rebalancing voltages are outputs from at least one force rebalancing control loop.

6. The MEMS inertial sensor of claim 5, wherein said at least one force rebalancing control loop comprises a single force rebalancing control loop.

7. The MEMS inertial sensor of claim 5, wherein said at least one force rebalancing control loop comprises multiple force rebalancing control loops.

8. The MEMS inertial sensor of claim 1, wherein said one or more rebalancing voltages comprises:
   one or more AC rebalancing voltages coupled to the one or more first torquer electrodes and adapted to control the Coriolis-related motion of the one or more proof masses; and
   one or more a DC rebalancing voltages coupled to the one or more second torquer electrodes and adapted to control the quadrature-related motion of the one or more proof masses.

9. The MEMS inertial sensor of claim 1, wherein said one or more first number of torquer electrodes are coupled to a first rebalancing voltage signal outputted from a first force rebalance controller, and wherein said one or more second Humber of torquer electrodes are coupled to a second rebalancing voltage signal outputted from a second force rebalance controller.

10. The MEMS inertial sensor of claim 9, wherein the first rebalancing voltage signal is 9B 45° out-of-phase with the second rebalancing voltage signal.

11. The MEMS inertial sensor of claim 9, wherein the first and second force rebalance controllers are separate controllers.

12. The MEMS inertial sensor of claim 9, wherein the first and second force rebalance controllers comprise a single controller.

13. The MEMS inertial sensor of claim 12, wherein said single controller is a multiple-input multiple-output controller.

14. The MEMS inertial sensor of claim 1, wherein said MEMS inertial sensor is a MEMS gyroscope.

15. The MEMS inertial sensor of claim 14, wherein said MEMS gyroscope is an in-plane MEMS gyroscope.

16. The MEMS inertial sensor of claim 14, wherein said MEMS gyroscope is an out-of-plane MEMS gyroscope.

17. The MEMS inertial sensor of claim 1, wherein said MEMS inertial sensor is an accelerometer.

18. A MEMS inertial sensor, comprising:
   one or more proof masses adapted to oscillate at a motor drive frequency;
   at least one sense electrode positioned adjacent to each of the one or more proof masses, the sense electrode adapted to capacitively sense proof mass motion along a sense axis perpendicular to a drive axis of the one or more proof masses;
   a first number of torquer electrodes adapted to provide rebalancing forces on said proof masses along the sense axis in a first direction, the first number of torquer electrodes adapted to selectively control Coriolis-related motion of the one or more proof masses along the sense axis; and
   a second number of torquer electrodes adapted to provide rebalancing forces in an opposite direction from the first direction along the sense axis, the second number of torquer electrodes adapted to selectively control quadrature-related motion of the one or more proof masses along the sense axis;
   wherein the rebalancing forces are adapted to maintain a fixed capacitance between each sense electrode and corresponding proof mass based on feedback from one or more force rebalancing control loops.

19. A method of force rebalancing a MEMS inertial sensor, the MEMS inertial sensor including one or more proof masses adapted to oscillate at a motor drive frequency, and at least one sense electrode positioned adjacent to each of the one or more proof masses, each sense electrode coupled to a sense bias voltage source for sensing displacement of the one or more proof masses along a sense axis perpendicular to a drive axis of the one or more proof masses, the method comprising the steps of:
   applying one or more time-varying rebalancing voltages to a plurality of torquer electrodes adjacent to each proof mass, wherein applying the rebalancing voltages comprises:
      providing a first rebalancing voltage to a first number of torquer electrodes adapted to selectively control Coriolis-related motion of the one or more proof masses along the sense axis; and
      providing a second rebalancing voltage to a second number of torquer electrodes adapted to selectively control quadrature-related motion of the one or more proof masses along the sense axis;
   sensing any displacement of the one or more proof masses along the sense axis and outputting a sense voltage having an amplitude in proportion to the proof mass displacement; and
   electrostatically nulling any proof mass motion along the sense axis based on the outputted sense voltage.

20. The method of claim 19, wherein the rebalancing voltages applied to each of the torquer electrodes are adapted to maintain a fixed capacitance between each sense electrode and corresponding proof mass.

21. The method of claim 19, wherein said step of electrostatically nulling proof mass motion along the sense axis is accomplished by adjusting the rebalancing voltages using at least one force rebalancing control loop.

22. The method of claim 21, wherein said at least one force rebalancing control loop comprises a single force rebalancing control loop.

23. The method of claim 21, wherein said at least one force rebalancing control loop comprises multiple force rebalancing control loops.

24. The method of claim 19, wherein the time-varying rebalancing voltages include one or more AC rebalancing voltages.

25. The method of claim 24, wherein the AC rebalancing voltages include a rebalancing voltage signal component whose frequency is about half of a motor drive frequency, and a carrier voltage signal component whose frequency is about half of the motor drive frequency, wherein said rebalancing voltage signal component is 90° out-of-phase with the carrier voltage signal component.

26. The MEMS inertial sensor of claim 18, wherein said proof masses are interposed between a lower substrate and an upper substrate, and said first number of torquer electrodes are positioned on said lower substrate, and said second number of torquer electrodes are positioned on said upper substrate.

27. The method of claim 19, wherein said proof masses are interposed between a lower substrate and an upper substrate, and said first number of torquer electrodes are positioned on said lower substrate, and said second number of torquer electrodes are positioned on said upper substrate.

* * * * *